United States Patent
Fayad et al.

(10) Patent No.: US 7,783,864 B2
(45) Date of Patent: Aug. 24, 2010

(54) VERTICAL AND HORIZONTAL PIPELINING IN A SYSTEM FOR PERFORMING MODULAR MULTIPLICATION

(75) Inventors: Camil Fayad, Poughkeepsie, NY (US); John K. Li, Woodstock, NY (US); Siegfried Sutter, Elsendorf (DE); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 11/673,752

(22) Filed: Feb. 12, 2007

(65) Prior Publication Data
US 2008/0195848 A1     Aug. 14, 2008

(51) Int. Cl.
G06F 9/44     (2006.01)
G06F 7/38     (2006.01)
(52) U.S. Cl. .................................. 712/221; 708/491
(58) Field of Classification Search ............. 712/221; 708/491
See application file for complete search history.

(56) References Cited

U.S. PATENT DOCUMENTS

| | | | | |
|---|---|---|---|---|
| 5,867,725 A * | 2/1999 | Fung et al. | ..................... | 712/23 |
| 6,804,696 B2 * | 10/2004 | Chen et al. | ................... | 708/491 |
| 6,839,861 B2 | 1/2005 | Hoke et al. | | |
| 6,922,717 B2 * | 7/2005 | Ruehle | ........................ | 708/620 |
| 2006/0265555 A1 * | 11/2006 | Davis et al. | .................. | 711/147 |

* cited by examiner

*Primary Examiner*—Eddie P Chan
*Assistant Examiner*—William B Partridge
(74) *Attorney, Agent, or Firm*—Cantor Colburn LLP; Steven Chiu

(57) ABSTRACT

The partitioning of large arrays in the hardware structure, for multiplication and addition, into smaller structures results in a multiplier design which includes a series of nearly identical processing elements linked together in a chained fashion. As a result of simultaneous operation in two subphases per processing element and the chaining together of processing elements, the overall structure is operable in a pipelined fashion to improve throughput and speed. The chained processing elements are constructed so as to provide a pardonable chain with separate parts for processing factors of the modulus.

5 Claims, 23 Drawing Sheets

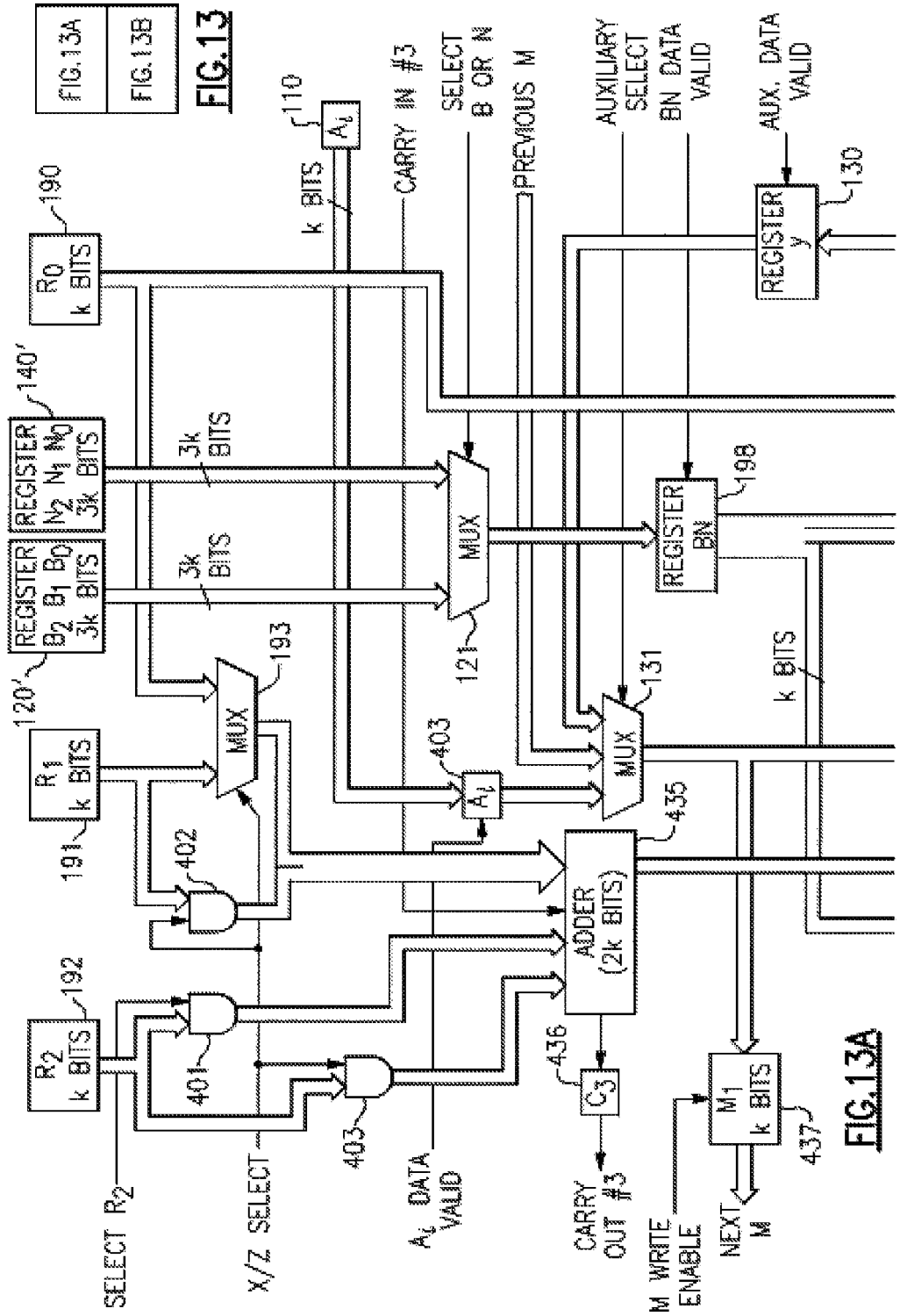

FIG.17

| | | | | | |
|---|---|---|---|---|---|
| | | | | PE0a-X0 | 1 |
| | | | | PE0b | |
| | | | PE1a-X1 | PE0a-Z0 | 2 |
| | | | PE1b | PE0b-X0 | |
| | | PE2a-X2 | PE1a-Z1 | PE0a-X0' | 3 |
| | | PE2b | PE1b-X1 | PE0b-Z0 | |
| | PE3a-X3 | PE2a-Z2 | PE1a-X1' | PE0a-Z0' | 4 |
| | PE3b | PE2b-X2 | PE1b-Z1 | PE0b-X0' | |
| PE3a-X4 | PE2a-Z3 | PE1a-X2' | PE0a-Z1' | | 5 |
| PE3b-X3 | PE2b-Z2 | PE1b-X1' | PE0b-Z0' | | |
| PE3a-X5 | PE2a-Z4 | PE1a-X3' | PE0a-Z2' | | 6 |
| PE3b-X4 | PE2b-Z3 | PE1b-X2' | PE0b-Z1' | | |
| PE3a-Z5 | PE2a-X4' | PE1a-Z3' | | PE0a-X0'' | 7 |
| PE3b-X5 | PE2b-Z4 | PE1b-X3' | PE0b-Z2' | | |
| PE3a-X5' | PE2a-Z4' | | PE1a-X1'' | PE0a-Z0'' | 8 |
| PE3b-Z5 | PE2b-X4' | PE1b-Z3' | | PE0b-X0'' | |
| PE3a-Z5' | | PE2a-X2'' | PE1a-Z1'' | PE0a-X0''' | 9 |
| PE3b-X5' | PE2b-Z4' | | PE1b-X1'' | PE0b-Z0'' | |
| | PE3a-X3'' | PE2a-Z2'' | PE1a-X1''' | PE0a-Z0''' | 10 |
| PE3b-Z5' | | PE2b-X2'' | PE1b-Z1'' | PE0b-X0''' | |
| | PE3a-X4'' | PE2a-Z3'' | PE1a-X2''' | PE0a-Z1''' | 11 |
| | PE3b-X3'' | PE2b-Z2'' | PE1b-X1''' | PE0b-Z0''' | |
| PE3a-X5'' | PE2a-Z4'' | PE1a-X3''' | PE0a-Z2''' | | 12 |
| PE3b-X4'' | PE2b-Z3'' | PE1b-X2''' | PE0b-Z1''' | | |
| PE3a-Z5'' | PE2a-X4''' | PE1a-Z3''' | | PE0a-X0'''' | 13 |
| PE3b-X5'' | PE2b-Z4'' | PE1b-X3''' | PE0b-Z2''' | | |
| PE3a-X5''' | PE2a-Z4''' | | PE1a-X1'''' | PE0a-Z0'''' | 14 |
| PE3b-Z5'' | PE2b-X4''' | PE1b-Z3''' | | PE0b-X0'''' | |
| PE3a-Z5''' | | | | | 15 |
| PE3b-X5''' | PE2b-Z4''' | | PE1b-X1'''' | PE0b-Z0'''' | |

CLOCK CYCLE ↓

VERTICAL AND HORIZONTAL PIPELINING IN A SYSTEM FOR PERFORMING MODULAR MULTIPLICATION

BACKGROUND OF THE INVENTION

The present application is directed to a method and apparatus for performing encryption and decryption. More particularly, the present application is directed to modular arithmetic circuits and methods, as opposed to standard arithmetic operations.

Modular arithmetic, with its implied division operations, is much more difficult to perform and to calculate, particularly where exponentiation modulo N is involved.

The multiplication of binary numbers modulo N is an important operation in modern, public-key cryptography. The security of any cryptographic system which is based upon the multiplication and subsequent factoring of large integers is directly related to the size of the numbers employed, that is, the number of bits or digits in the number. For example, each of the two multiplying factors may have a large number of hits, perhaps 1,024 bits. However, for cryptographic purposes, if is necessary to carry out this multiplication modulo a number N. Accordingly, it should be understood that the multiplication considered herein multiplies two n bit numbers to produce a result with n bits or less, rather than the usual 2n bits in conventional multiplication.

However, even though there is a desire for inclusion of a large number of bits in each factor, the speed of calculation becomes significantly slower as the number of digits or bits increase. It may be convenient to break up the modulo N multiplication of large numbers into a series of operations as to smaller pieces of each number which are handled by each of a set of processing elements arranged in a series. For example in commonly owned U.S. Pat. No. 6,804,696 describes a system and method in which operational cycles used to perform modulo N multiplication are partitioned into two phases; X and Z. Each processing element in a series of processing elements performs the X-phase of a modulo N multiplication operation, after which each processing element performs the Z-phase, then returning to the X-phase again.

SUMMARY OF THE INVENTION

The partitioning of large arrays in the hardware structure, for multiplication and addition. Into smaller structures results in a multiplier design which includes a series of nearly identical processing elements linked together in a chained fashion. As a result of simultaneous operation in two subphases per processing element and the chaining together of processing elements, the overall structure is operable in a pipelined fashion to improve throughput and speed. The chained processing elements are constructed so as to provide a partitionable chain with separate parts for processing factors of the modulus.

In accordance with an aspect of the invention, a method is provided for multiplying two multiplicands A and B modulo a divisor number N. In such method, partitioned portions of the multiplicands are supplied to respective processing elements of a chain of processing elements. Desirably, each of the processing elements is operated simultaneously in a pipelined set of first subphases and a pipelined set of second subphases to produce first partial products in the set of first subphases and second partial products in the set of second subphases, such that in each of the processing elements simultaneously performs work of one of the set of first subphases and work of one of the set of second subphases. Desirably, partial products produced within the processing elements in the set of first phases are passed to at least one earlier processing element in the chain. In addition, partial products produced within the processing elements in the set of second phases can be passed to at least one subsequent processing element in the chain. Temporary results can be accumulated in a register set holding one of the partitioned multiplicands over sufficient number of operational cycles to produce a product modulo the divisor number in the register set.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 17 is a diagram illustrating utilization of processing elements in each of two X0, X1 subphases and two Z0, Z1 subphases of operation in accordance with an embodiment of the invention.

DETAILED DESCRIPTION

Figure 1:
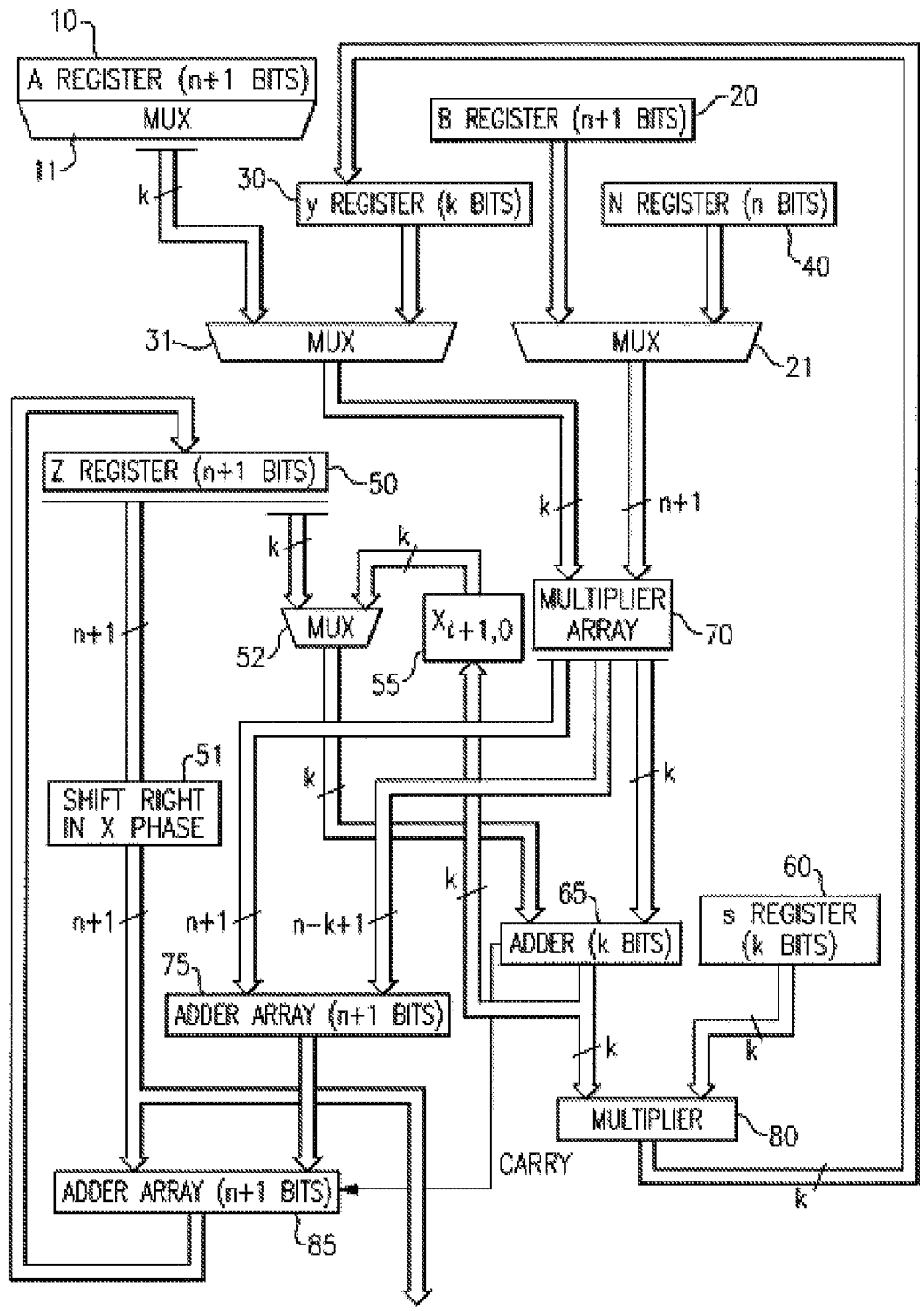
FIG. 1 is a block diagram illustrating operations performed in a method and system for multiplication modulo N described herein.

In accordance with a preferred embodiment of the present invention, an initial zero value is stored in a result register $Z_0$. The integers A and B which are to be multiplied using the present process are partitioned into m blocks with k bits in each block. The multiplication is carried out modulo N. Additionally, the value R is set equal to $2^k$. In this way, the integer A is representable as $A = A_{m-1}R^{m-1} + \ldots + A_2R^2 + A_1R + A_0$. This is the partitioning of the integer A into m blocks.

In one embodiment of the present invention, a method and circuit are shown for computing a function $Z = f(A,B) = AB \, 2^{-mk} \bmod N$. Later, it will be shown how this function is used to calculate AB mod N itself.

The system, methods, and circuits utilized in embodiments of the present invention are best understood in the context of the underlying algorithm employed. Furthermore, for purposes of understanding this algorithm, it is noted that modular computation is carried out modulo N, which is an odd number and n is the number of bits in the binary representation of N. Additionally, $N_0$ represents the least significant k bits of N. Also, a constant s is employed which is equal to $-1/N_0 \bmod R = 1/(R-N_0) \bmod R$. With this convention, the algorithm is expressed in pseudo code as follows:

$Z_o = 0$
for i=0 to m−1
  $X_i = Z_i + A_i B$
  $y_i = s \, x_{i,o} \bmod R$ ($x_{i,0}$ is the least significant k bits of $X_i$)
  $Z_{i+1} = (X_i + y_i N)/R$
end.

There are two items to note in particular about this method for carrying out modulo N multiplication. The first thing to note is that the multiplication is based upon a partitioning of one of the factors into sub-blocks with k bits in each block. This greatly simplifies the size of multiplier arrays which need to be constructed. It furthermore creates a significant degree of parallelism which permits the multiplication operation be carried out in a much shorter period of time. The second item to note is that the partitioning also results in the splitting of the process not only into a plurality of m cycles, but also, splits the method into two phases that occur in each cycle. In the first phase (X-phase), the values $X_i$ and $y_i$ are computed. In the second phase (Z-phase), the intermediate result value $Z_{i+1}$ is calculated. It should be noted that, in the calculation of $X_i$ and in the calculation of $Z_{i+1}$, there is an addition operation and a multiplication operation. This fact allows the same hardware which performs the multiplication and addition in each of these steps to be shared rather than duplicated. With respect to the division by R in the formation of $Z_{i+1}$, it is noted that this is accomplishable by simply discarding the low order k bits. Other advantages of this structure will also become apparent.

The output of the above hardware and method produces the product

AB $2^{-mk}$ mod N. To produce the more desirable result AB mod N, the method and circuit employed above is used a second time. In particular, the original output from this circuit is supplied to one of its input registers with the other register containing the factor $2^{2mk}$ mod N. This factor eliminates the first factor of $2^{-mk}$ added during the first calculation and also cancels the additional factor of $2^{-mk}$ included when the circuit is run the second time. This produces the result AB mod N.

For those who wish to practice the processes of the present invention via software, it is noted that the algorithm for multiplication provided above is readily implemeniatale in any standard procedure-based programming language with the resulting code, in either source or object form, being readily storable on any convenient storage medium, including, but certainly not limited to, magnetic or optical disks. This process is also eminently exploitable along with the use of the exponentiation processes described below, including processes for exponentiation based on the Chinese Remainder Theorem.

In the process described above it is noted that one of the process inputs is the variable "s". This value is calculated as a negative inverse modulo R. In order to facilitate the generation of this input signal, a special circuit for its generation is described herein. This circuit also takes advantage of existing hardware used in other parts of a processing element. In particular, it forms a part of the rightmost processor element in a chain.

Note that, in the calculation shown above for $X_i$ and $Z_i$, these are more than n bit numbers. Accordingly, the multiplication and addition operations are carried out in relatively large circuits which are referred to herein as multiplier and adder arrays. In accordance with a preferred method of practicing the present invention, the adder array and multiplier array are split into sub-blocks. While this partitioning of hardware may be done using any convenient number of blocks, partitioning into blocks capable of processing k bite at a time is convenient. Thus, in the preferred embodiment, instead of employing one large multiplier array for processing two numbers having n+1 bite and k bits; with n being much greater than k, a plurality of separate k bit by k bit multipliers are employed. Additionally, it is noted that partitioning into processor element sub-blocks, while useful in and of itself particularly for circuit layout efficiency, also ultimately makes it possible to operate the circuit in several pipelined modes.

In a first pipelined mode, the circuit is operated through a plurality of cycles, m, in which adjacent processor elements are operated in alternate phases. That is, in a first pipelined mode, if a processor element is in the X-phase, its immediate neighbors are operating in the Z-phase, and vice versa. In a second pipelined mode, the pipelined operation is continued but with new entries in the input registers (A and B) which now are also preferably partitioned in the same manner as the multiplier and adder arrays.

Since n is generally much greater than k (1,024 as compared to 32, for example) and since carry propagation through adder stages can contribute significantly to processing delays, the partitioning and pipelining together eliminate this source of circuit delay and the corresponding dependence of circuit operation times on the significant parameter n whose size, in cryptographic contexts, determines the difficulty of unwarranted code deciphering.

The pipelined circuit in accordance with an embodiment of the present invention is also particularly useful in carrying out exponentiation modulo N, an operation that is also very useful in cryptographic applications. Such an operation involves repeated multiplication operations. Accordingly, even though pipelining may introduce an initial delay, significant improvements in performance of exponentiation operations are produced.

In one embodiment found within the disclosure herein it has been noted that the chaining together of individually operating Processing Elements introduces an addition operation in a critical timing path, that is, into a path whose delayed execution delays the whole process. The present invention provides an improvement in the design of the individual Processing Elements through the placement of this addition operation in an earlier portion of the Processing Element's operation. In doing so, however, new control signals are also provided to make up for the fact that some signals in some of the Processing Elements are not yet available at this earlier stage and accordingly are, where convenient, provided from operations occurring or which have already occurred in adjacent Processing Elements.

The Processing Elements used herein are also specifically designed so that they may function in different capacities. In particular, it is noted that the rightmost Processing Element performs some operations that are unique to its position as the lower order Processing Element in the chain. Likewise the leftmost element has a unique role and can assume a simpler form. However, the Processing Elements employed herein are also specially designed and constructed so as to be able to adapt to different roles in the chain. In particular, the middle Processing Element is controllable so that it takes on the functional and operational characteristics of a rightmost Processing Element. In this way the entire chain is partitionable so that it forms two (or more, if needed) separate and independent chains operating (in preferred modalities) on factors of the large odd integer N.

While an intermediate object of the present invention is the construction of a modular multiplication engine, a more final goal is providing an apparatus for modular exponentiation. In the present invention this is carried out using the disclosed modular multiplier in a repeated fashion based on the binary representation of the exponent. A further improvement on this process involves use of the Chinese Remainder Theorem for those parts of the exponentiation operation in which the factors of N are known. The capability of the Processing Element chain of the present invention to be partitioned into two portions is particularly useful here since each portion of the controllably partitioned chain is able to work on each of the factors of N in an independent and parallel manner.

Since one wishes to operate computational circuits at as high a speed as possible and since this can some times lead to erroneous operations, there is provided a challenge in how to detect errors when the operations being performed are not based on standard arithmetic, but are rather based on modular arithmetic (addition, subtraction, inversion and multiplication and exponentiation). However, the present invention solves this problem through the use of circuits and methods which are not only consonant with the complicating requirements of modular arithmetic operations but which are also capable of being generated on the fly with the addition of only a very small amount of additional hardware and with no penalty in time of execution or throughput. The structure and operation of the present invention is dependent upon the partitioning of one of the multiplying factors into a plurality of k bit-wide pieces. Thus, Instead of representing a binary number A as $$\sum_{i=0}^{n-1} a_i 2^j$$

one of the multiplying factors in the present invention is represented instead in the form.

$$A_{m-1}R^{m-1} + \ldots + A_i R^2 + A_j R + A_0 = \sum_{j=0}^{m-1} A_j R^j,$$

where $R=2^k$.

In this representation, the number A is represented in block form where each of the m blocks includes k bits. That is, each $A_i$ represents an integer having k bits.

In the present system, multiplication modulo an odd number N is a significant object. Also, for purposes of understanding the present invention, the symbol n is used to denote the number of bits in the binary representation for N. Also, for present purposes, it is assumed that the number A, as stored in Register A (reference numeral 10 in FIG. 1), is the number that is partitioned into m blocks. In general, the number of blocks m is selected to be the smallest integer for which $mk \geq n+2$. Additionally, it is understood that $N_0$ represents the least significant k bits of the number N. Likewise, the constant s is equal to the negative reciprocal of $N_0$ taken modulo R (that is, $-1/N_0$ mod R).

From a mathematical point of view, the present applicants have employed an algorithm for which the input variables are the two numbers being multiplied, namely, A and B, the modulo number N, the constant s associated with N, and the parameters m, k and $R=2^k$. The output of the function provided by the present invention Z is given by $Z=f(A, B)= AB2^{-mk}$ mod N. The procedure specified by applicants' method initializes the value $Z_0$ to be zero and, for the integer i ranging from 0 to m−1, calculations are carried out to produce $X_i$ and $y_i$ and $Z_{i+1}$. The values for $X_i$ and $y_i$ are computed during a first operational phase of each one of m cycles. The value $Z_i$ is computed during a second phase of each cycle. The adders and multipliers used to calculate $X_i$ are "time shared" to also carry out the calculation needed to produce $Z_i$. In particular, at each stage i, $X_i$ is given by $Z_i+A_iB$. At this stage, the value of $y_i$ is also computed as the constant s times the least significant k bits of $X_i$ modulo R. If one represents the least significant k bits of $X_i$ as $x_{i,0}$ then $y_i = s \times x_{i,0}$. This completes the operations that are carried out in a first phase (X-phase) during one of the cycles of the present process. In the second phase (Z-phase), an updated value for Z register (50 in FIG. 1) is computed as $(X_i+y_iN)/R$. At the last stage of processing, the desired value of Z is present in the Z register. In particular, at this stage, $Z_m=AB2^{-mk}$ mod N. At each stage (cycle), values for $X_i, y_i$, and $Z_i$ are stored for purposes of computation in subsequent steps.

It is noted that if both input variables A and B have n+1 bits, the output of the function provided by the present invention $Z=f(A, B)=AB\ 2^{-mk}$ mod N, for N being an n-bit odd number, has no more than n+1 significant bits. That is, the output is less than $2^{n+1}$. The hardware circuit described herein takes as inputs A and B of n+1 bits each and generates as output Z of n+1 bits.

A hardware circuit for carrying out this process is illustrated in FIG. 1. In particular, the factor A of n+1 bits, which is the factor which is treated as being in partitioned form, is stored in A register (10). Multiplexor 11 supplies sequential blocks of k bits from register 10 to multiplexor 31, with k=32 bits for illustration. Multiplexors 31, 21, and 52 operate in conjunction with one another selecting one of two possible input values depending upon whether or not the circuit is operating in the X-phase or the Z-phase, Accordingly, during the first phase of its operation, multiplexor 11 provides the k bits in $A_0$. In the first phase of the second cycle, the next k bits $A_i$ in A are supplied via multiplexor 11. A sub-block of k bits from A is provided during the initial or X phase portion of each cycle. In the third cycle, multiplexor 11, therefore, provides the next k bits in A, namely, the bits denoted above and herein as $A_2$. Accordingly, multiplexor 11 is seen to operate selectively as a function of the cycle number (namely, cycles 0 through m−1).

During the X-phase of each cycle, the value $A_i$ is selected from the A Register (10) via multiplexor 11 and correspondingly multiplexor 21 selects the contents of the B Register (20). Thus, in accordance with the present invention, the numbers to be multiplied are stored in registers 10 and 20. It does not matter which number is stored in which register. It is also noted that, whether or not the circuit is operating in the initial X-phase or in the final Z-phase in each cycle, multiplexors 31 and 21 supply k bite and n+1 bits, respectively, to multiplier array 70 in each phase. It is thus seen that, during the X-phase, multiplexors 31 and 21 select contents from the B register and pad of the A register. It is also noted that, in typical situations, the value of n is often around 512 or more and the value of k is approximately 32. Accordingly, it is seen that multiplier array 70 strikes a balance between 1 bit×n bit multiplication and full n bit×n bit multiplication. It is also noted that increases in the value of n are almost always, in practice, an increase by a factor of at least a power of 2.

As with any binary multiplier with inputs that are n+1 bits wide and k bits wide respectively, multiplier array 70 produces an output which is n+1+k bits wide. The lower order k bits from multiplier array 70 are supplied to adder 65 which is designed to add two k bit addends at a time. In this regard, it is noted that adder 65 is present in the circuit for computing $y_i$. As such, and given that the value of $y_i$ is dependent upon the last k bits of the value $X_I$ which is a sum which has not yet been fully computed, it is necessary to perform this addition which is essentially the addition for the low order k bits of $X_i$. The first addend comes from the rightmost k bits in the Z register as selected by multiplexor 52. These bits are added to the k bits in the rightmost portion of the product $A_I$ B. The output of adder 65 is $X_{i,0}$ which is the least significant k bits of $X_I=Z_I+A_iB$. This output is stored in register 55 and is also supplied to multiplier 80 which multiplies two k bit numbers together. This is not however, a multiplication modulo N. The other factor supplied to multiplier 80 is the number s from the s register (60). Since this result is required modulo R, only the rightmost k bits from multiplier 80 are supplied back to the y register (30) in this X-phase. The value stored in this register is used during the calculation carried out in the Z-phase as discussed below.

The rest of the X-phase calculation is devoted to calculation of the high order n+1 bits of the sum $Z_I+A_iB$. Multiplier 70 is configured as a circuit for multiplying together the bits from the B Register (20) and a sequence of m blocks of k bits each from selected k bit blocks $A_i$ from the A register. Multiplication of two k bit numbers generally produces a number having 2k bits and, in particular, this is the situation with respect to applicants' multiplier 80. However, it is noted that the calculation of $y_i$ is computed modulo R. The modulo requirement of the computation is easily accomplished simply by returning only the rightmost k bits from the output of multiplier 80 to the input of the y Register (30).

As pointed out above, multiplication of numbers generally produces outputs having bit lengths greater than either of the two input number bit lengths. In particular, with respect to multiplier 70, the output is considered to be n+1+k bits in length. The low order (rightmost) k hit output is supplied from multiplier 70 to adder 65. However, each k bit block multiplication carried out in multiplier array 70 produces 2k bits formed as a k bit "result" and a k bit "carry" into the next position. The summation to produce the desired intermediate output $A_i$ is carried out in adder 75 which adds together two portions, the first portion which is n+1 bits long and the second portion which is only n+1−k bits long. The n+1−k bits represent the "carry" portion of the multiplication. Accordingly, the output of adder array 75 is the result of the high order n+1 bits of $A_iB$. This result is supplied directly to adder array 85 which adds to it a shifted value of $Z_i$ from Z register 50. And appropriately, this high order n+1 bits of $X_i=Z_i+A_iB$ is stored in Z register 50 in preparation for the Z-phase calculation. The low order k bits of $X_i$ are stored in register 55 as described above.

In the Z-phase of an operation cycle, multiplier array 70 and adders 75 and 85 are again employed except that now the inputs to multiplier array 70 are the contents of they Register (30) as selected by multiplexor 31. The other factor supplied to multiplier array 70 is the contents of the N register (40) which is selected during the Z-phase of an operation cycle by means of multiplexor 21. As before, multiplier may 70 computes the product of an n+1 bit number and a k bit number. Adder array 75 performs the natural addition operation associated with multiplication in which there is an effective carry-like operation from one k bit subfield to the next k bit subfield. Accordingly, the output of adder array 75 during the Z-phase of operation is the high order n+1 bits of the product $y_i$ N. The addition of $y_i$ N and the value $X_i$ together with its division by R in the present method is accomplished by discarding the tow order k bits from the output of adder 65 and storing only the high order n+1 bits from adder 86 to register 50.

Figure 2:
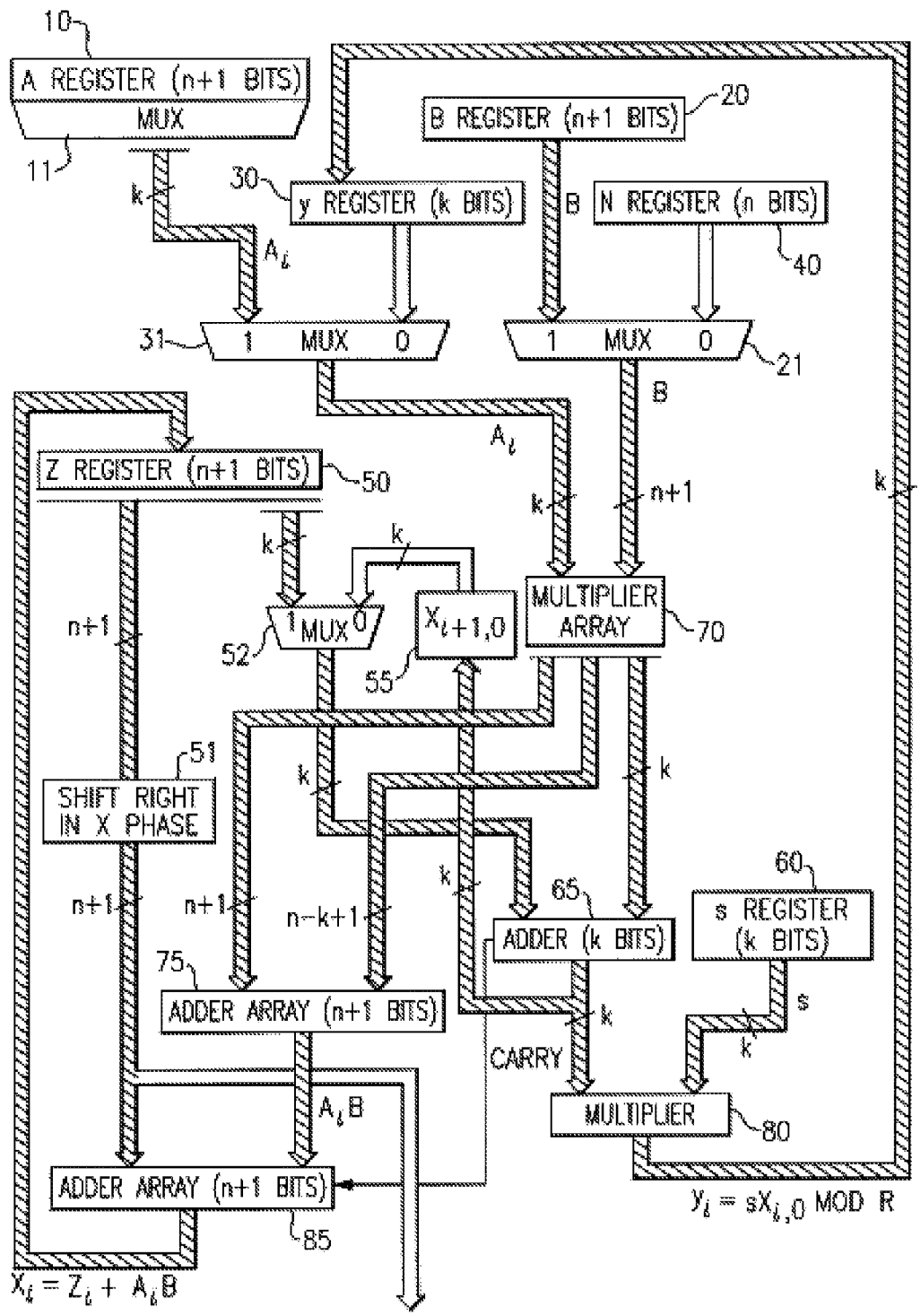
FIG. 2 is a block diagram similar to FIG. 1, except more particularly showing those data flow paths which are active during a first, or X-phase of calculation.
Figure 3:
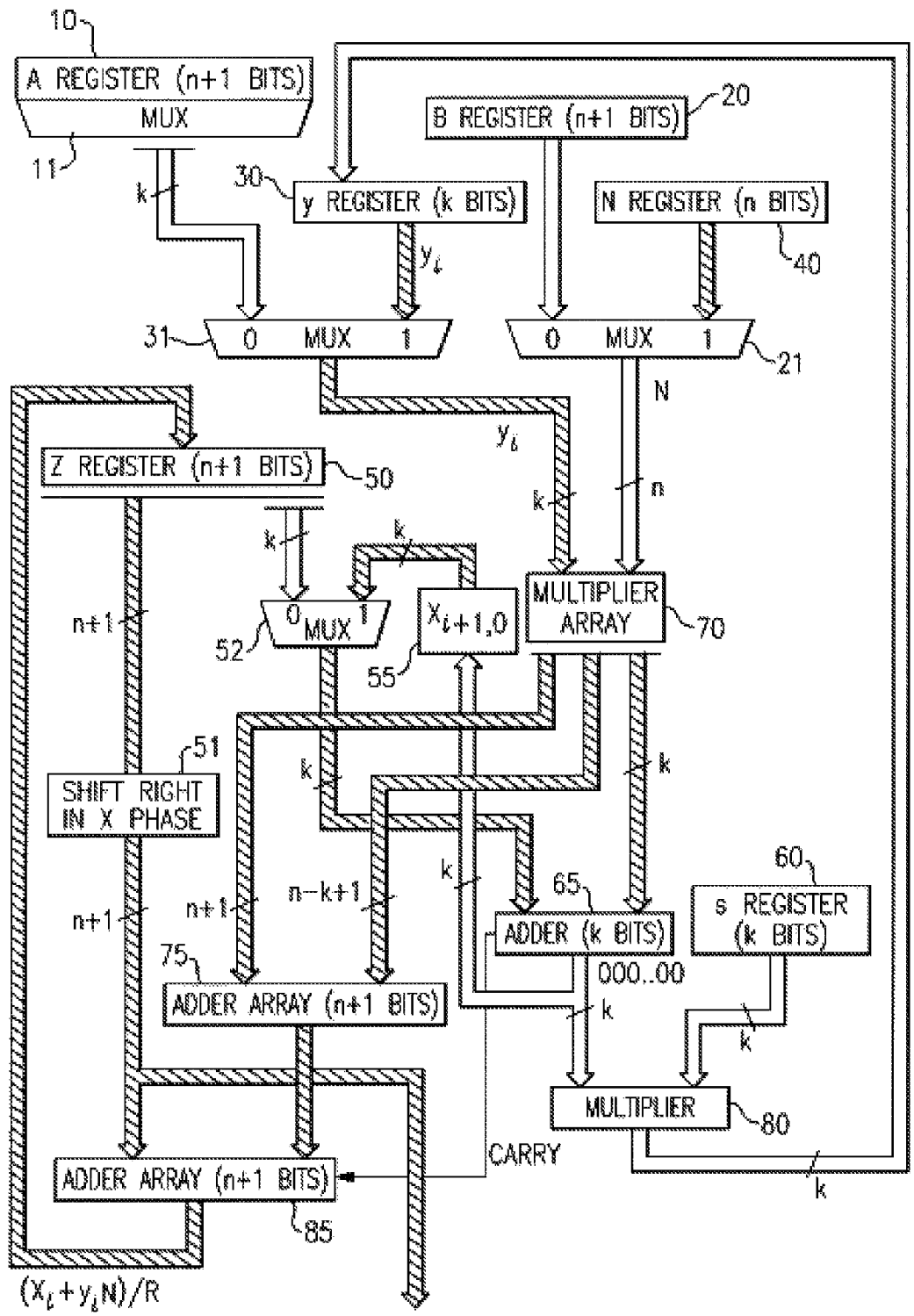
FIG. 3 is a block diagram similar to FIGS. 1 and 2, except more particularly showing those data flow paths which are active during the second or Z-phase of calculation.

The differences in the X-phases and Z-phases of operation are more fully appreciated from an inspection of the differences between FIGS. 2 and 3. In particular, FIG. 2 illustrates the active data flow paths that are present in the first or X phase of each operational cycle. Likewise, FIG. 3 illustrates the data flow paths which are active during the second or a Z-phase of each operational cycle. The calculations that are carried out in the X-phases and Z-phases are repeated a total of m times with the final result $Z_m$, being one of the desired results at the end of m cycles of operation with each cycle including an X-phase and a Z-phase. At this stage of operation, the value present in Z register 50 is AB $2^{-mk}$ mod N.

The circuit illustrated in FIGS. 1-3 is also capable of producing the multiplicative result AB mod N. This is accomplished by first using the circuit shown to compute AB $2^{-mk}$ mod N and then by using the circuit again with either the A or B register being provided with the output from the first operational stage and multiplying this value by $2^2mk$ mod N. Since each operation of the circuit (through m cycles) introduces the factor of $2^{-mk}$, the multiplication by $2^2mk$ cancels the first factor $2^{-mk}$ introduced during the first stage of operation of the circuit and also cancels the other factor of $2^{-mk}$ introduced during the second multiplicative stage of operation. Thus, using two passes (two stages) with m cycles each through the circuit of FIGS. 1-3, the result AB mod N is computed. For purposes of clarify and ease of understanding and description as used herein, an operational stage of the process of the present invention refers to m cycles of circuit operation following the loading of the factors into the A and B registers.

The operation of the above circuit is perhaps more easily understood by means of the following example in which k=3, $R=2^3$, $N=107=R^2+5R+3=(1, 5, 3)=(N_2, N_1, N_0)$, $N_3=3$, m=3, $s=-1/N_0$ mod R=5, $A=83=R^2+2R+3=(1, 2, 3)$, $B=70=R^2+0R+6=(1,0,6)$. Decimal digits are employed here merely for the sake of example and for an easier understanding of the process. For a more detailed illustration, the decimal numbers may be represented as blocks containing 3 bits each. The process carried out by the circuit disclosed above occurs in three steps as follows (i=0; i=1, and i=2):

Step 1
$X_0=Z_0+A_0B=(3, 2, 2)$, $y_0=2s$ mod R=2
$y_0N=(2, 10, 6)=(3, 2, 6)$
$X_0+y_0N=(6, 5, 0)$
$Z_1=(X_0+y_0N)/R=(0, 6, 5)$
Step 2
$A_1B=(2, 0, 12)=(2, 1, 4)$
$X_1=Z_1+A_1B=(3, 0, 1)$, $y_1=s=5$
$y_1N=(5, 25, 15)=(0, 2, 7)$
$X_1+y_1N=(1, 3, 3, 0)$
$Z_2=(1, 3, 3)$
Step 3
$A_2B=(1, 0, 6)$
$X_2=Z_2+A_2B=(2, 4, 1)$, $y_1=s=5$
$y_2N=(5, 25, 15)=(1, 0, 2, 7)$
$X_2+y_2N=(1, 2, 7, 0)$
$Z_3=(1, 2, 7)=87$
$87 \times R^3 = A \times B$ mod N=32.

Although it is the objective to compute AB mod N where AB and N are all n bits long, for convenience, fie process heroin employs A, B, and Z registers that are n+1 bits or mk bits long, This avoids the necessity for checking the final and intermediate results to determine whether or not they are in fact greater than N. This aspect, for example, shows up in Step 2 in the example provided above.

Figure 4:
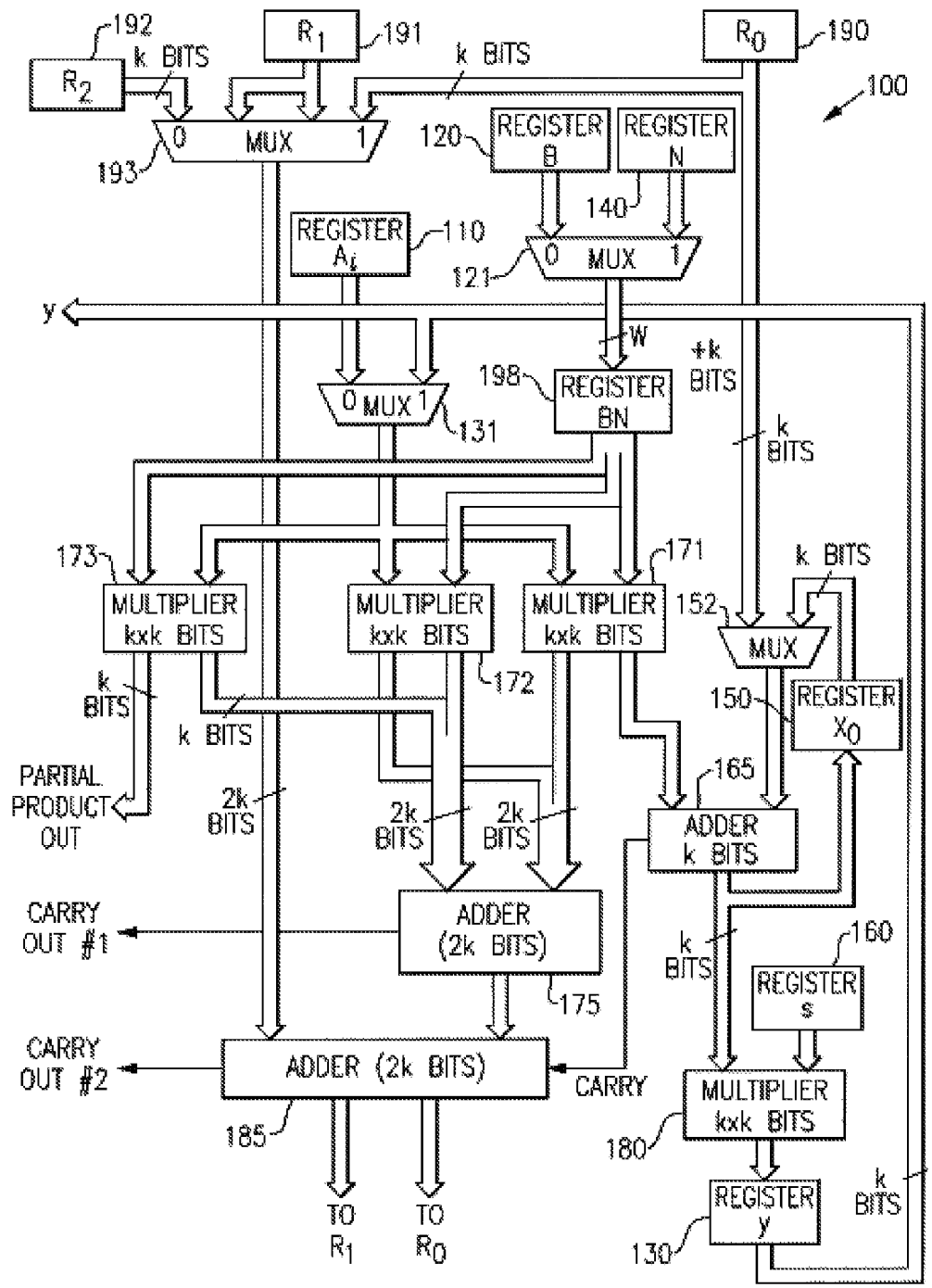
FIG. 4 is a block diagram of the rightmost processing element in a series of processing elements in a partitioned embodiment of the circuit of FIG. 1.
Figure 5:
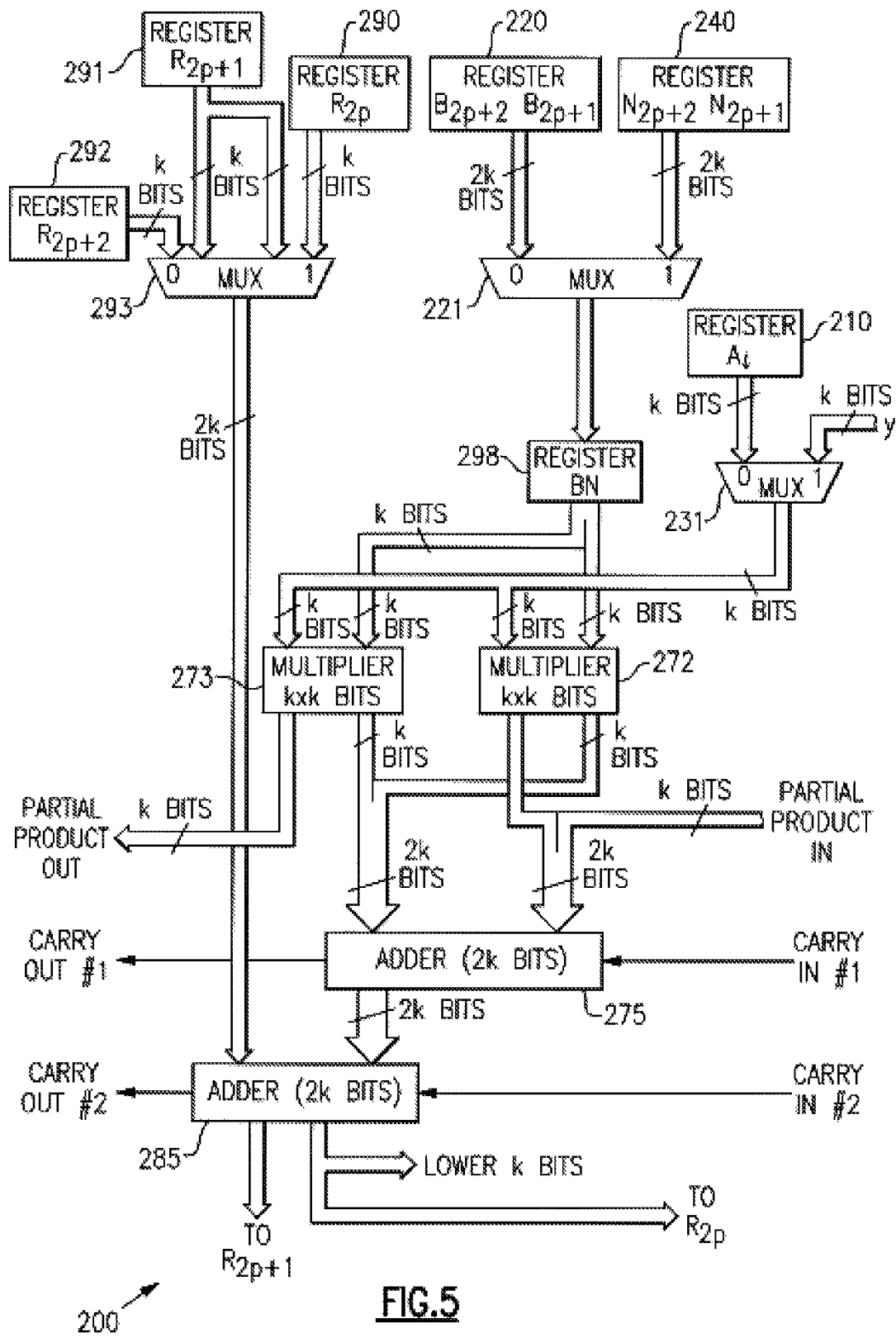
FIG. 5 is a block diagram illustrating one of a plurality of identical processing elements which are configurable as a series of processor elements capable of performing the same operation as the circuit shown in FIG. 1.
Figure 6:
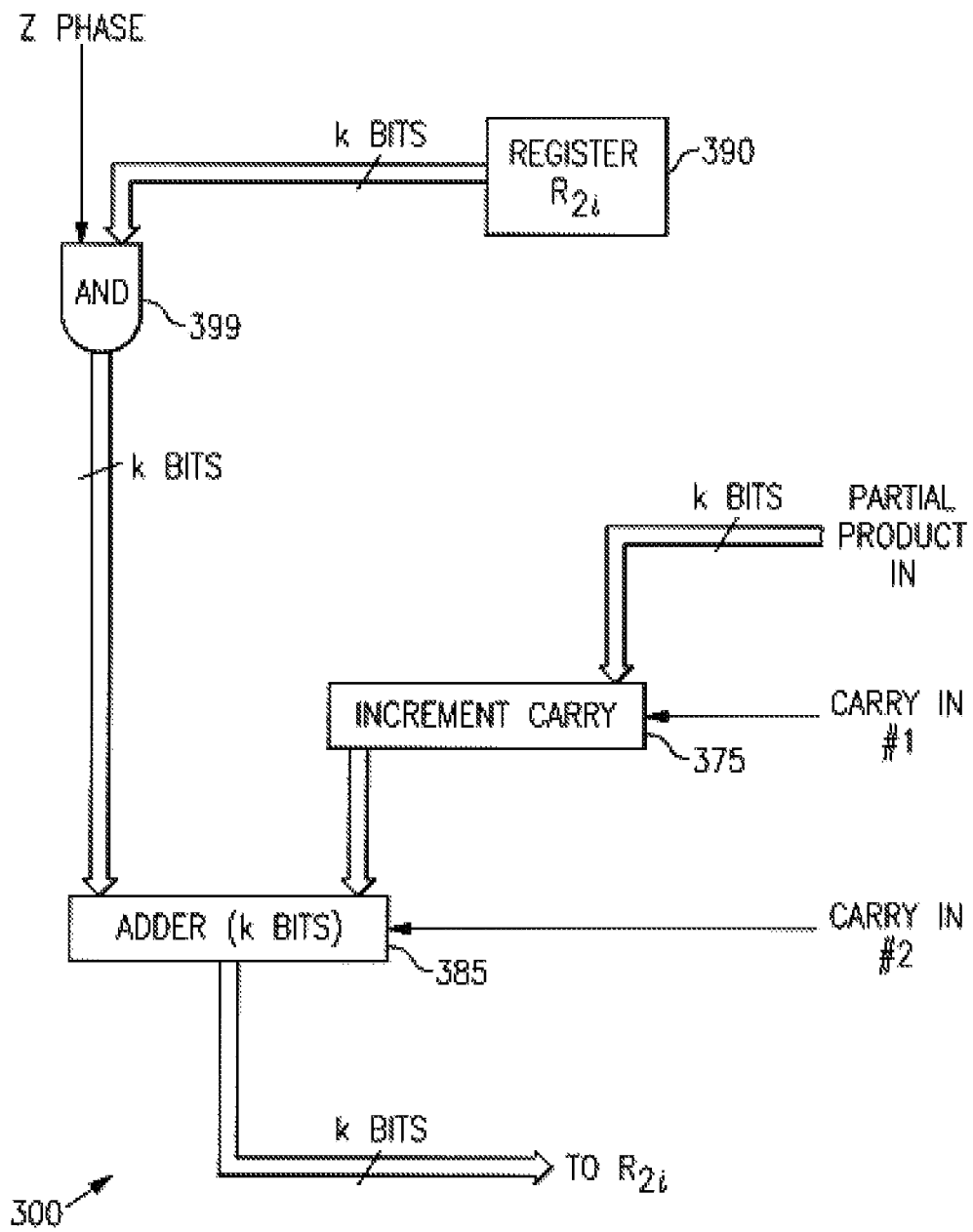
FIG. 6 is a block diagram illustrating the form of a processing element that could expeditiously be employed as the last or leftmost processor element in a series of processor elements for carrying out the same calculations as the circuit of FIG. 1.

The present inventors have also recognized that, at least partly due to the typically large difference between the size of n and k, there is a certain disparty in processing that occurs in the construction of an n by k multiplier. Accordingly, it is possible to partition the calculation carried out in the circuit shown in FIGS. 1-3. In particular, the circuit shown in FIG. 1 is in fact constructable in the form of a plurality, d+1, of processor elements (PE) which are connected together in a chained or cascaded fashion. Each of the processing elements is constructed in the same way. However, the processing element for the rightmost portion of the data, herein referred to as $PE_0$, has a somewhat more complicated structure, as shown in FIG. 4. A simpler circuit is employed for processing elements 1 through d. However, in preferred embodiments, the leftmost or last processor element $PE_d$ can in fact be constructed much more simply as shown in FIG. 6. Accordingly, FIG. 4 shows a structure for a processing element circuit for the rightmost portion of the data. FIG. 5 illustrates a circuit for a processing element which is usable in a repeated fashion which utilizes as many individual processing elements as necessary and thus, illustrating the scalability aspects of the present invention. Lastly, FIG. 6 illustrates a preferred, simplified embodiment for the last or leftmost processing element.

For purposes of understanding and appreciating the embodiment of the invention illustrated in FIGS. 4, 5 and 6, the registers $R_0$ through $R_d$, as illustrated in FIGS. 4, 5, and 6, are not considered as a part of the processing elements per so but rather are best understood as pad of a separate, partitioned register structure. It is these registers that contain the desired results of the modulo N multiplication operation. These registers thus serve the same function as the Z register in FIG. 1.

Wish specific reference to FIG. 4, It is seen that multiplexor 193 operates during the X-phase to supply a 2k bit augend to adder 185. During the first or X-phase of operation, multiplexor 193 supplies a 2k bit number which has leftmost bits from register $R_2$ (reference numeral 192) and rightmost bits from register $R_1$ (reference numeral 191). During the second or Z-phase of operation, multiplexor 193 supplies a different 2k bits of data to adder 185. In particular, during the Z-phase multiplexor 193 supplies as its leftmost k bits the contents of register $R_1$, and as its rightmost k bits the contents of register $R_0$ (reference numeral 190).

Figure 7:
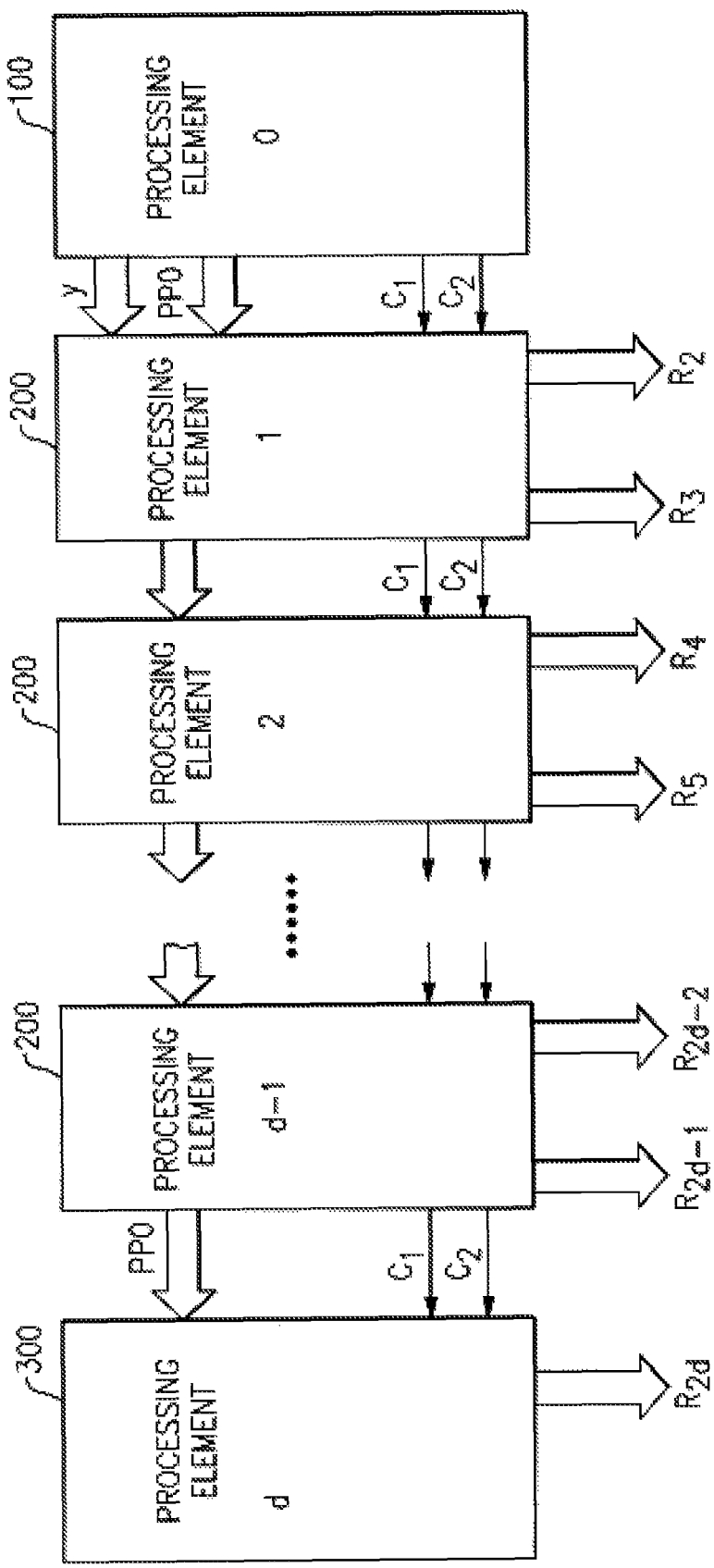
FIG. 7 is a block diagram illustrating how the processor elements described in FIGS. 4, 5, and 6 are connected to produce the same results as the circuit shown in FIG. 1.

In contrast to the full-width registers 10, 20, 40, and 50 in FIG. 1, the corresponding registers in a partitioned system have fewer bits. In particular, the corresponding B end N variable registers in a general processing element PE preferably employs a width equal to 2k bits. However, for the rightmost processing element, a larger number of bits is desired. In particular, in the case in which n equals 512, registers 120 and 140 in FIG. 4 preferably have a width of 96 bits. Multiplexor 121 selects the contents of register B (reference numeral 120) during the X-phase of computation and likewise selects the contents of register N (reference numeral 140) during the Z-phase of computation. In general, the overall n-bit wide series of computations is broken down into partitions of any convenient size. It is not even necessary that all of the processor elements are the same size or process the same data width. However, for conveniences of circuit design and circuit layout, it is preferable that each of the individual processing elements (except for the rightmost element, $PE_0$) have the same data processing capability in terms of data width. Therefore, in general, for purposes of consideration and discussion herein, it is assumed that there are a total of d+1 processing elements labeled from $PE_0$ through $PE_d$, as illustrated in FIG. 7. Processing element $PE_0$ preferably has a structure such as that shown in FIG. 4, $PE_d$ has the preferred structure illustrated in FIG. 6, although it is noted that a more generic structure, such as that shown in FIG. 5, may be employed for the leftmost processor element $PE_d$ though it is not necessary that this leftmost processing element be any more complicated than that shown in FIG. 6.

Figure 5A:
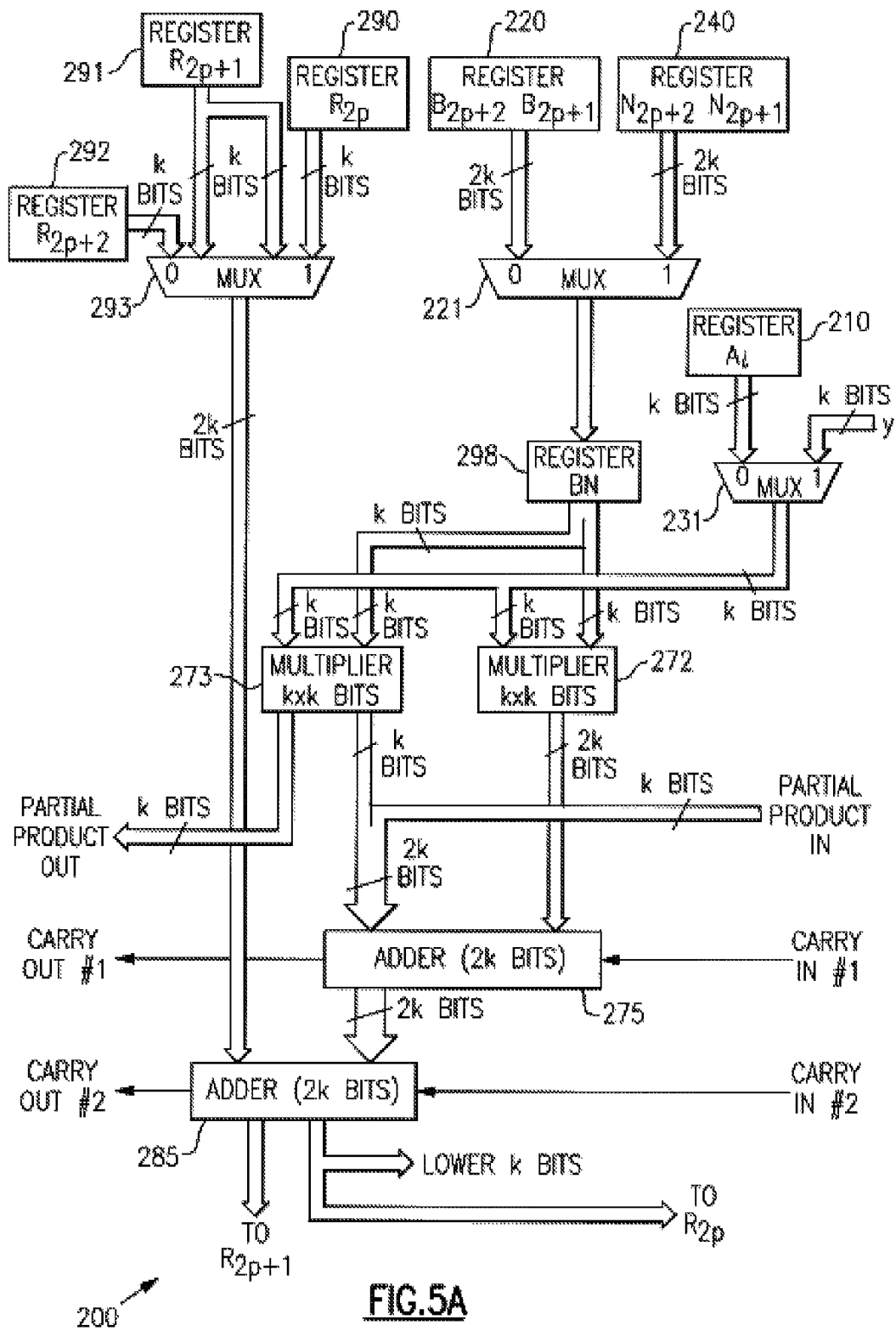
FIG. 5A is a block diagram similar to FIG. 5 but which also illustrates an alternate multiplier-to-adder connection.

Also, for purposes of convenience of circuit design, layout, and packaging efficiency, it is generally desirable that the data width, W, of each processing element be an integer multiple of k. In the designs presented herein for a value of n=512, processor elements $PE_1$ through $PE_{d-1}$, each process data in 2k bit wide chunks. Thus, in this example, W=2k, where W is the width of the data in each of the typical or generic forms of processing element, as illustrated in FIGS. 5 and 5A. It is noted that processor element $PE_0$ as shown in FIG. 4 possesses an extra k bit processing capability, as is more particularly described below. Thus, if each typical processing element $PE_1$ processes data in W bit wide chunks and if there are d+1 processing elements with the rightmost processing element processing an extra k bits, then it is the preferred case that n=Wd+k. Thus, in general, the output of multiplexor 121 preferably comprises W+k bits. The leftmost third of these bits are supplied to multiplier 173, the middle third of the bits in register BN (reference numeral 198) are supplied to multiplier 172, and the rightmost third bits are supplied to multiplier 171. Multipliers 171, 172, and 173 are thus each k bit by k bit multipliers. In this regard, it is noted that the original relatively large multiplier array 70 in FIG. 1 employs an n by k multiplier. However, it is noted that the partitioning of the computation into a system employing a plurality of nearly identical processing elements results in the construction of circuits which now utilize multipliers which operate much more quickly since each multiplier now is typically only k bits by k bits. And clearly since k is typically much less than n, processing takes place significantly faster.

Figure 4A:
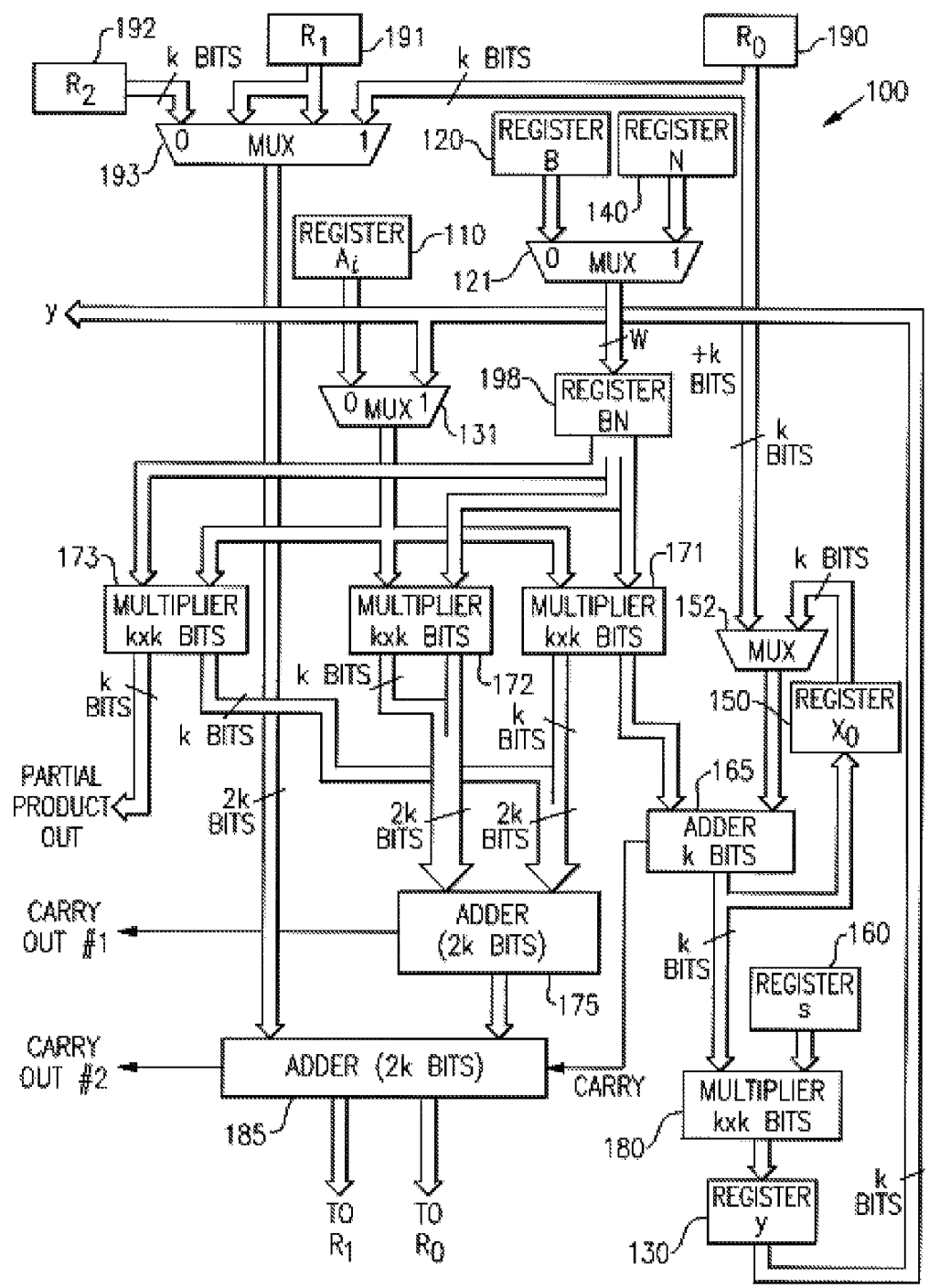
FIG. 4A is a block diagram similar to FIG. 4 but which illustrates an alternate multiplier-to-adder connection.

The leftmost of the 2k bits output from multiplier 173 are supplied as a partial product out (PPO) to the next unit in the chain. In particular, it should be appreciated that in the discussions herein, that the natural order of processing is from the rightmost processing element 100 on through to the leftmost processing element 300 in the chain (see FIG. 7). Thus, data is passed from one processing element to the processing element on its immediate left. However, it should be noted that left and right are relative terms useful essentially only for descriptive and understanding purposes. The rightmost k bits from multiplier 173 are supplied as the leftmost k bits of a 2k bit augend supplied to adder 175. The rightmost k bits of this 2k bit augend are supplied from the lower or rightmost k bits of multiplier 172. Thus, the rightmost k bits of multipliers 173 and 172, respectively, are combined, as shown in FIG. 4, to supply a 2k bit wide augend to adder 175. Adder 175 also has as its other input a 2k bit augend which is supplied from the leftmost k bits of multiplier 172 and 171, respectively, with multiplier 172 supplying the leftmost k bits of the 2k bit augend and with multiplier 171 supplying the rightmost k bits of the 2k bit augend supplied to adder 175. Thus, adder 175 is a 2k bit wide adder. An equivalent but alternate connection arrangement is shown in FIG. 4A.

Multiplexor 152 operates to select, during the X-phase of computation, k bits from register $R_0$ (reference numeral 190). During the Z-phase, multiplexor 152 selects as its input the contents of temporary register 150 containing the variable $x_0$. The output of multiplexor 152 is supplied to adder 165 which is k bite in width. Adder 165 receives two augends, namely, the rightmost k bits from multiplier 171 and the k bits supplied from multiplexor 152. The output of adder 165 is stored in temporary register 150 and is also supplied to multiplier 180 which is also a k bit by k hit multiplier. The other factor supplied to multiplier 180 is the contents of register 160 which contains the variable s. (The calculation of s is $-1/N_0$ mod R.) The output of multiplier 180 is supplied to register 130 which thus contains the value y as defined by the algorithm set out above.

The output of register 130 is supplied to multiplexor 131 and is also supplied to the next processing element $PE_1$ (see FIG. 5). Multiplexor 131 operates to select a portion of the variable A which is one of the factors in the multiplication operation. (Other k bit wide portions of variable A are selected by their respective processing elements.) In particular, register 110 contains the rightmost k bits of the variable A. Thus, during the X-phase of operation, multiplexor 131 operates to select the contents of register 110 to be supplied to multipliers 173, 172, and 171, as shown. Likewise, during the Z-phase of computation, multiplexor 131 operates to select the variable from register 130 to be supplied to this same set of multipliers as the other factor.

A carry-out signal line from adder 165 is also supplied as a carry input to the lowest order position in adder 185, as shown. Additionally, adder 175 supplies a first carry-out signal line to the next, processing element in the chain; similarly, adder 185 also supplies a second carry-out signal line to the next processing element in the chain. In particular, since FIG. 4 illustrates processing element $PE_0$, carry-out signal line 1 and carry-out signal line 2 are both provided to processing element $PE_1$. The connections between $PE_0$ and $PE_1$ are readily apparent simply by placing FIG. 4 to the right of FIG. 5. In particular, processing element $PE_0$ supplies the variable y, the partial product out and the two carry-out signal fines to the inputs shown in $PE_1$ of FIG. 5. In particular, it is also noted that the variable y (that is, the contents of register 130) is supplied to each one of the individual processing elements. And lastly, with respect to FIG. 4, it is noted that the output of adder 185 is supplied to registers $R_0$ and $R_1$ shown at the top of FIG. 4. As indicated above, it is the register set (containing $R_1$ and $R_0$ on the right) which ultimately contains the desired calculation result. Accordingly, reference numeral 100 in FIG. 4 describing processing element $PE_0$ does not include this register set. This register set is discussed separately below in terms of some of the other variations and structures that are employed in the present invention.

Attention is now directed to a discussion of FIG. 5 which illustrates a more typical processor element and, in particular, which illustrates the form of a processor element which may be repeated in a circuit/system chain which is as long as is required to process factors which are n bits wide.

With specific reference to FIG. 5, if is noted that it is similar to FIG. 4 except that the part of the processing dealing with k bit wide operations involving s and $N_0$ need not be present in any processing elements except the rightmost one, namely, $PE_0$. In particular, FIG. 5 indicates that the generic form of a processing element $PE_p$ bearing reference numeral 200 specifically does include register BN (reference numeral 298) but does not include the other registers shown. One of the significant differences between FIGS. 4 and 5 is that register 220 contains only a portion of the bits for the second factor B. In particular, register 220 contains 2k bit wide chunks designated as $B_{2p-2}$ and $B_{2p-1}$, where ranges from 1 to d−1. Again, as above, multiplexor 221 selects either the 2k bits from register 220 or the 2k bits from register 240 which has corresponding portions (here 2k bits chunks) of the variable N. Accordingly, register BN is 2k bits wide. Unlike register 198 in FIG. 4, register 298 (BN) in FIG. 5 is only 2k bits wide. In one preferred embodiment of the present invention when n=512, register BN is 64 bits wide.

From an overall perspective, general processing element $PE_1$ (reference numeral 200 as shown in FIG. 5) accepts, as input from the right, the value of y, the partial product in, carry-in 1 and carry-in 2. Processor element $PE_1$ also has as an input the corresponding portion of the k bits of the multiplier factor A from register 210. The register involvement for registers, 292, 291, and 290 is substantially as shown in FIG. 4 except now shown in the generic version of a processor element. It is these registers that store intermediate values between phases and ultimately store the completed product AB mod N. Also, from an overall perspective, processor element 200 produces, as an output, a k bit partial product out which is supplied to the processor element on its left together with carry out signals 1 and 2 which are supplied to the corresponding adders 275 and 285 in the processor element on the left. The output of adder 285 is supplied back to registers $R_{2p-1}$ and $R_{2p}$. Accordingly, other than the connections to the register sets for R, B, N, and A, the processing elements are connected simply by matching partial products in and out and carries in and out 1 and 2. Accordingly, in systems constructed in accordance with those aspects of the present invention which employ a plurality of similar processing units, the overall system is constructed by starting with the circuit shown in FIG. 4 or 4A as a rightmost position and placing, in adjacent positions, processing elements similar to those shown in FIG. 5 or 5A. The overall configuration, therefore, is seen in FIG. 7.

However, before proceeding, it is useful to consider the fact that the leftmost processor element $PE_d$ 300 (FIG. 6) does not have to be as complicated as the processing elements to its right such as these shown in FIG. 5 or 5A. In particular, the leftmost processing element only needs to process k bits. In the X-phase of operation, the circuit 300 shown in FIG. 6 acts to add carry-in 1 to the partial product input to the leftmost processing element via increment-carry circuit 375. Likewise, adder 385 adds carry-in 2 to the other input to adder 385 to produce an output which is supplied to register $R_2d$ in the immediate preceding processor element. In the Z-phase of operation as controlled by AND-gate 399, the contents of register $R_{2i}$ (reference numeral 390) are added to the output of increment carry circuit 375 and this is also supplied to register $R_{2i}$ in the feedback configuration as shown. Accordingly, it is seen that in partitioned embodiments of the present invention, it is preferable to employ a leftmost processing element which is simpler than that which is generally required in one of the generic processing elements between the rightmost and leftmost elements. However, while preferable, this substitution is not mandatory.

The partitioning of the computational problem as provided in one embodiment of the present invention into a solution having a plurality of nearly identical processing elements provides significant advantages in terms of design, efficiency, layout, and structure. Concomitantly, these advantages also lead to advantages, in circuit speed and throughput. However, it is also very important to note that the partitioning into a plurality of processing elements also provides significant advantages in terms of the fact that a pipelined operation is now possible. In particular, while pipelined operations generally introduce a small initial delay, the total throughput, as measured in terms of modulo N multiplications per time unit is significantly improved. Accordingly, a significant portion of the description below is devoted to a discussion of the use of the described partitioned processing element structure in conjunction with a pipelined method for operating the circuits shown in FIGS. 4, 5, and 6, and variations thereof.

Figure 8:
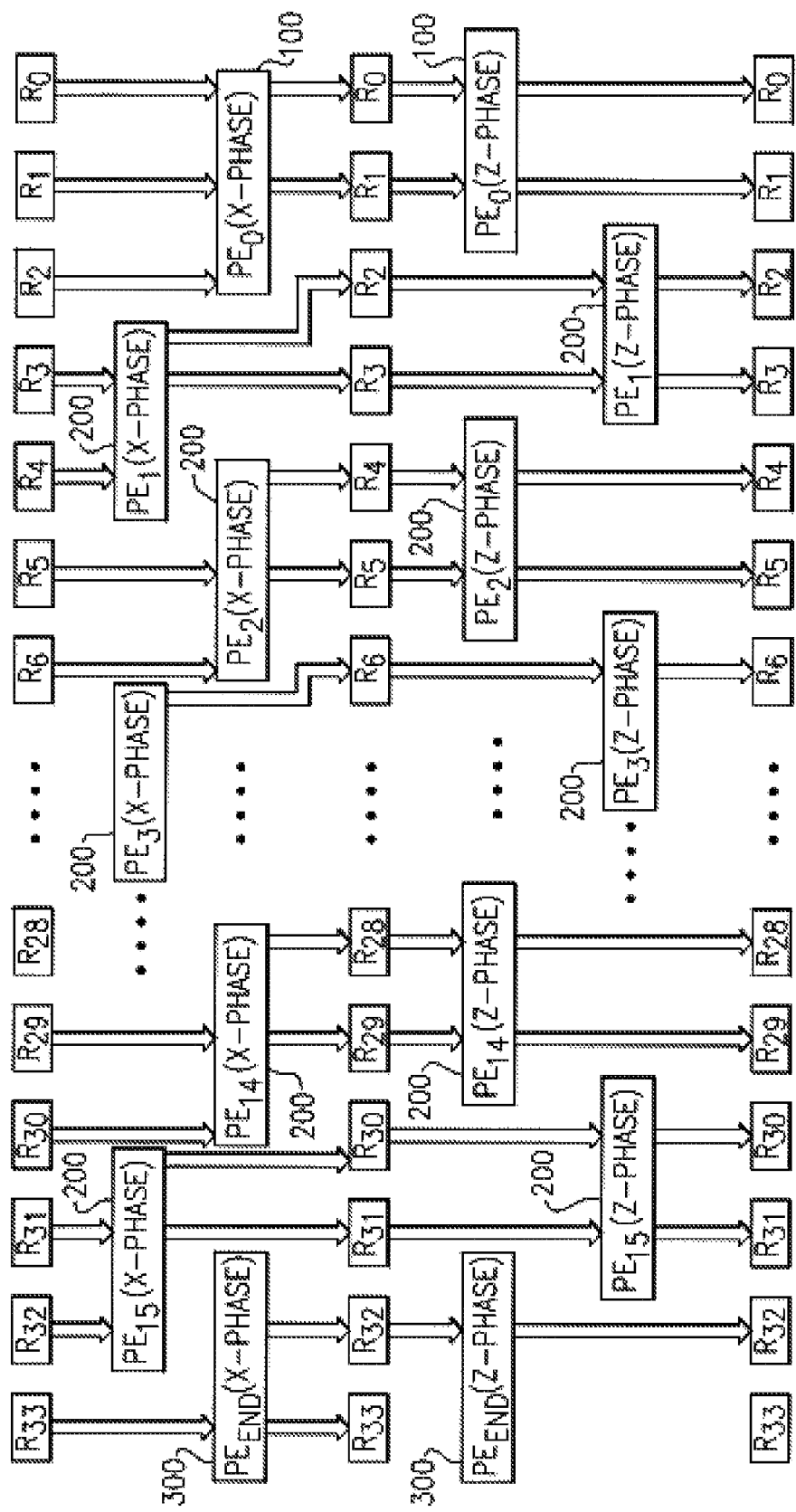
FIG. 8 is a block diagram illustrating the logical connection of processor elements over time with particular reference to register storage and the X and Z phases of operation.

However, before embarking on a discussion regarding the pipelining aspects of the present invention, it is also useful to note that the circuits shown in FIGS. 4-7 are perfectly capable of operation in a non-pipelined fashion. Such a mode of operation is illustrated in FIG. 8. In particular, it is noted that FIG. 8 is a logical time-sequence diagram illustrating the use of the register set $R_0$ through $R_{33}$ as a final and temporary storage medium for passing information between the X-phase of computation and the Z-phase of computation. FIG. 8 also more particularly illustrates the distinction pointed out above between the register set and the individual processing elements. This figure also illustrates the unique positions for the rightmost and leftmost processing elements wherein the rightmost element is supplied with information from three registers and wherein the leftmost processing element receives direct information only from the leftmost portion of the register set, namely, $R_{33}$ since, in this particular case, n is assumed to be 1,024 and k is assumed to be 32. Not shown in FIG. 8 are the signal connections between the processing elements. Rather, FIG. 8 is meant to be illustrative of time sequencing and the utilization of the register set. In particular, it should also be noted that, in FIG. 8, the processor elements in the upper half of the illustration are all operating in the X-phase at the same time, and likewise, all of the processing elements in the lower portion are operating in the Z-phase. Variations of this operational modality are more particularly described below with respect to FIG. 9 and considerations relating to pipelining of the information into and out of the circuit. In the case of no pipelining, such as shown in FIG. 8, all of the processing elements start to process data at the same time and finish at the same time. In any given clock cycle, all of the processing elements are either all in the X-phase or are all in the Z-phase of calculation. In this node, each processing element updates a fixed slice of the complete partial result register (two $R_i$ registers). Since all of the partial product registers are updated at the same time, everything works smoothly in accordance with the algorithm described above.

Attention is now directed to that aspect of the present invention in which the processing elements are operated in a pipelined fashion. In order to achieve this result, certain hardware modifications are made to the circuits shown in FIGS. 4 and 5. These modifications are more particularly illustrated in FIGS. 10 and 11, respectively, to be discussed more particularly below.

Figure 9:
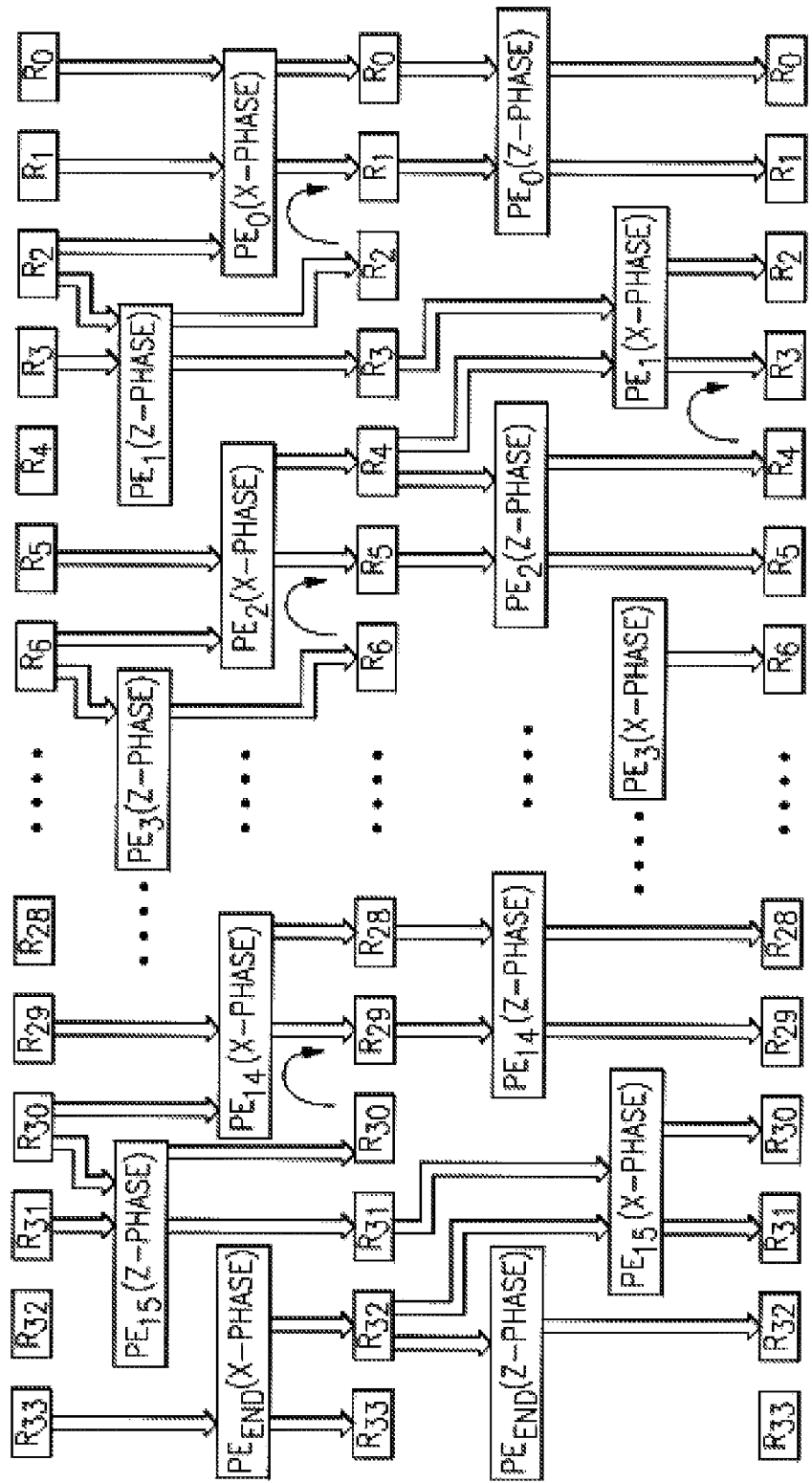
FIG. 9 is a block diagram illustrating the use of processor elements in a pipelined fashion.

However, for purposes of better understanding the utilization of the processing elements in a pipelined fashion, attention is specifically directed to FIG. 9. In the pipelined approach, it is the case that, in a given clock cycle, any two adjacent processing elements are always in different phases with the processing element processing the less significant slice of data always being one clock cycle ahead. As seen by the circular arrows in FIG. 9, it is unfortunately the case that, while a given processing element is in the X-phase, it requires, as input, a 32-bit value from the Z-phase that is being calculated at the same time by the next processing element in the chain that is still in the previous Z-phase. For example, as shown in FIG. 8, the rightmost processing element $PE_0$ on the top right is in the X-phase. This requires, as an input, the value in $R_2$ from processing element $PE_1$ which is one clock cycle behind in the Z-phase. This problem is solved by adding a feedback paths from the next processing element in the chain, which links to a k-bit adder (see reference numeral 235 in FIG. 10 and reference numeral 135 in FIG. 11). This solution creates additional delay due to the presence of a new k-bit adder. However, the maximum working frequency is not significantly affected since a k-bit adder is a relatively fast circuit. Additionally, it is noted that the previous signal path, before this change, was not a critical path. The original critical path occurred in the rightmost processing element $PE_0$ due to the calculation of the constant y. The advantage to this particular solution is that there is no need to modify the formulas in the algorithm; however, on the other hand, the maximum frequency is nonetheless slightly effected. Additional variations, to be considered more particularly below, consider this minor problem and provide yet another solution which eliminates the delay introduced by adder 235 and 135. In any event, either of the two pipelining solutions presented is an improved solution over that provided by the purely parallel approach illustrated in FIG. 8.

Figure 10:
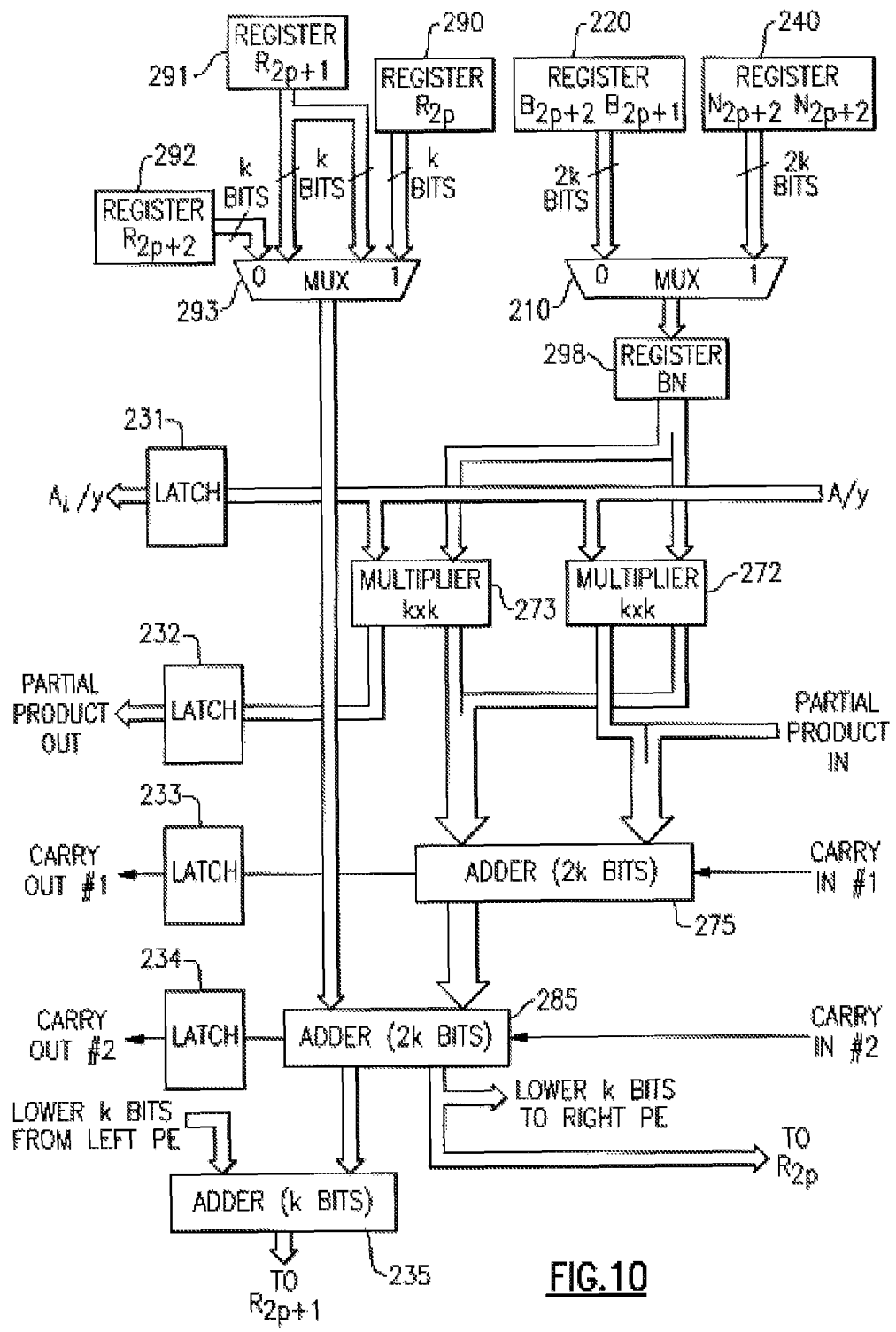
FIG. 10 is a block diagram illustrating a typical processor element as configured for use in a pipelining mode.
Figure 11:
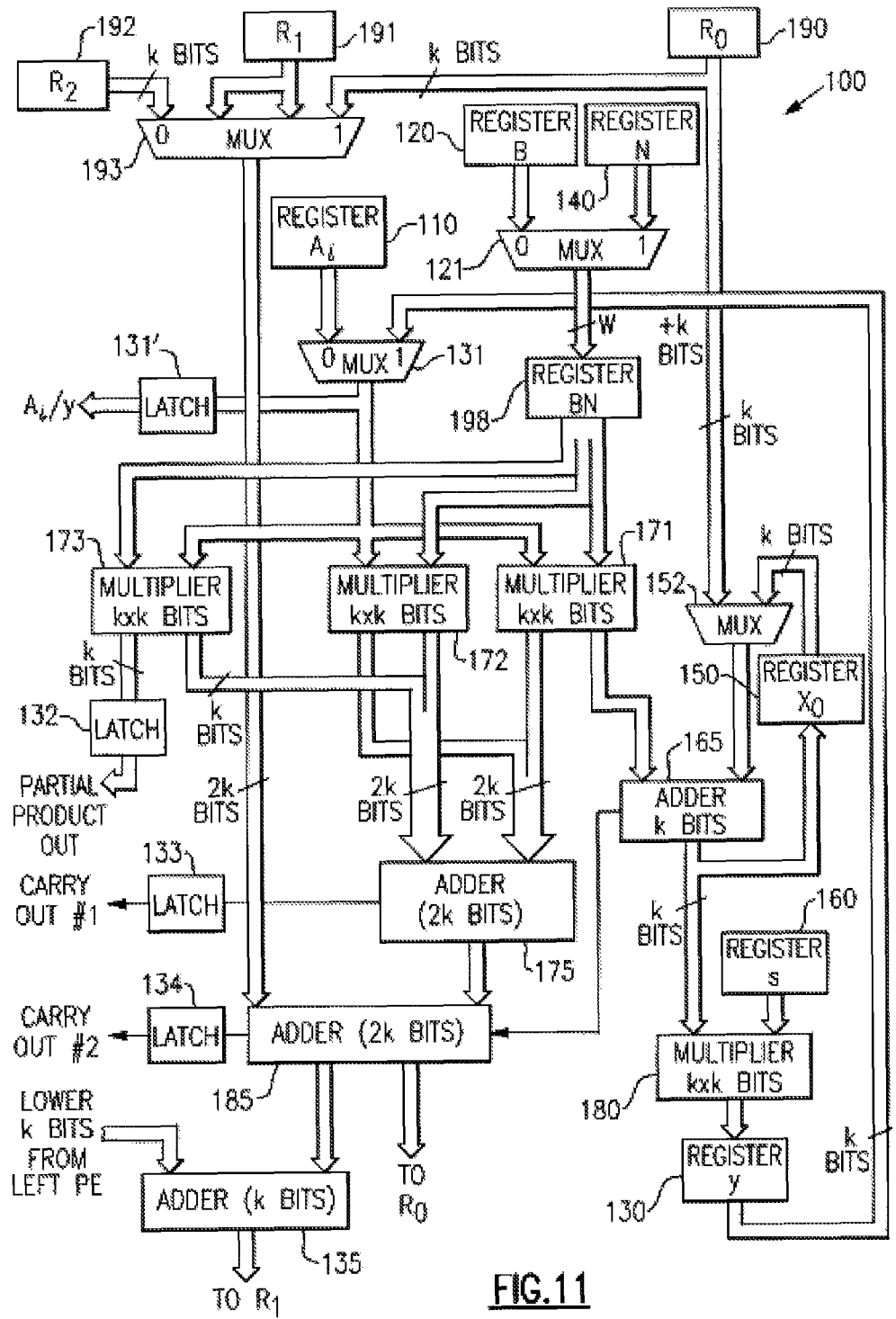
FIG. 11 is a block diagram similar to FIG. 10 but more particularly illustrating a processor element to be used in the rightmost or lower order position.

As pointed out above, FIG. 10 is similar to FIG. 5, but more particularly illustrates the inclusion of extra, hardware elements that are used to achieve smooth operation in a pipelined fashion. In particular, latches 232, 233, and 234 are added as temporary storage mechanisms between processors elements for holding the k bit wide partial products out (PPO), and the single bit carry-out lines 1 (from adder 275) and 2 (from adder 285). Additionally, it is noted that latch 231 stores either the selected k bit wide portion of multiplier factor $A_i$ or the constant y. This is provided in an alternating fashion from multiplexor 131 (as shown in FIG. 11). Additionally, it is noted that the lower k bits from the output of adder 285 are supplied to the adjacent adder 235 which is actually present in the preceding processing element, namely the one to the right in a similar fashion, the lower k bits from the next (that is, the left) processing element are supplied to adder 235. Additionally, there is a feedback connection (not shown for reasons of drawing congestion) from the output of adder 235 to the corresponding segment of the register "set," namely, to $R_{2p+1}$.

Similar changes in the circuit are made to the rightmost processing element $PE_0$, as shown in FIG. 11. In particular, latches 131, 132, 133, and 134 are added to serve a function that is the same as that provided by latches 231, 232, 233, and 234 in FIG. 10. And as in FIG. 10, adder 135 is now included to incorporate the extra addition step for pipelined operations. It is also noted that latch 131' in FIG. 11 is supplied from multiplexor 131. It is from this latch that values of $A_i$ and y are supplied to subsequent processing elements in the chain. In this regard, it is also noted that register 110 containing the value $A_i$ is illustrated in FIG. 11 as a k bit register, while in fact the preferred embodiment is the one illustrated in FIG. 1 in which a long A register with n+1 bits provides information to a multiplexor which selects subsequent k bit wide chunks from the contents of the A register. Accordingly, register 110 in FIG. 11 is preferably constructed as illustrated from register 10 and multiplexor 11 in FIG. 1. The simplification shown in FIG. 11 is only for clarify and for ease of understanding. Also, as is seen in the corresponding portion of FIG. 4, the output of multiplexor 121 is preferably W+k bits wide where W is the width of the data chunks processed by each of the generic processing elements.

Figure 12:
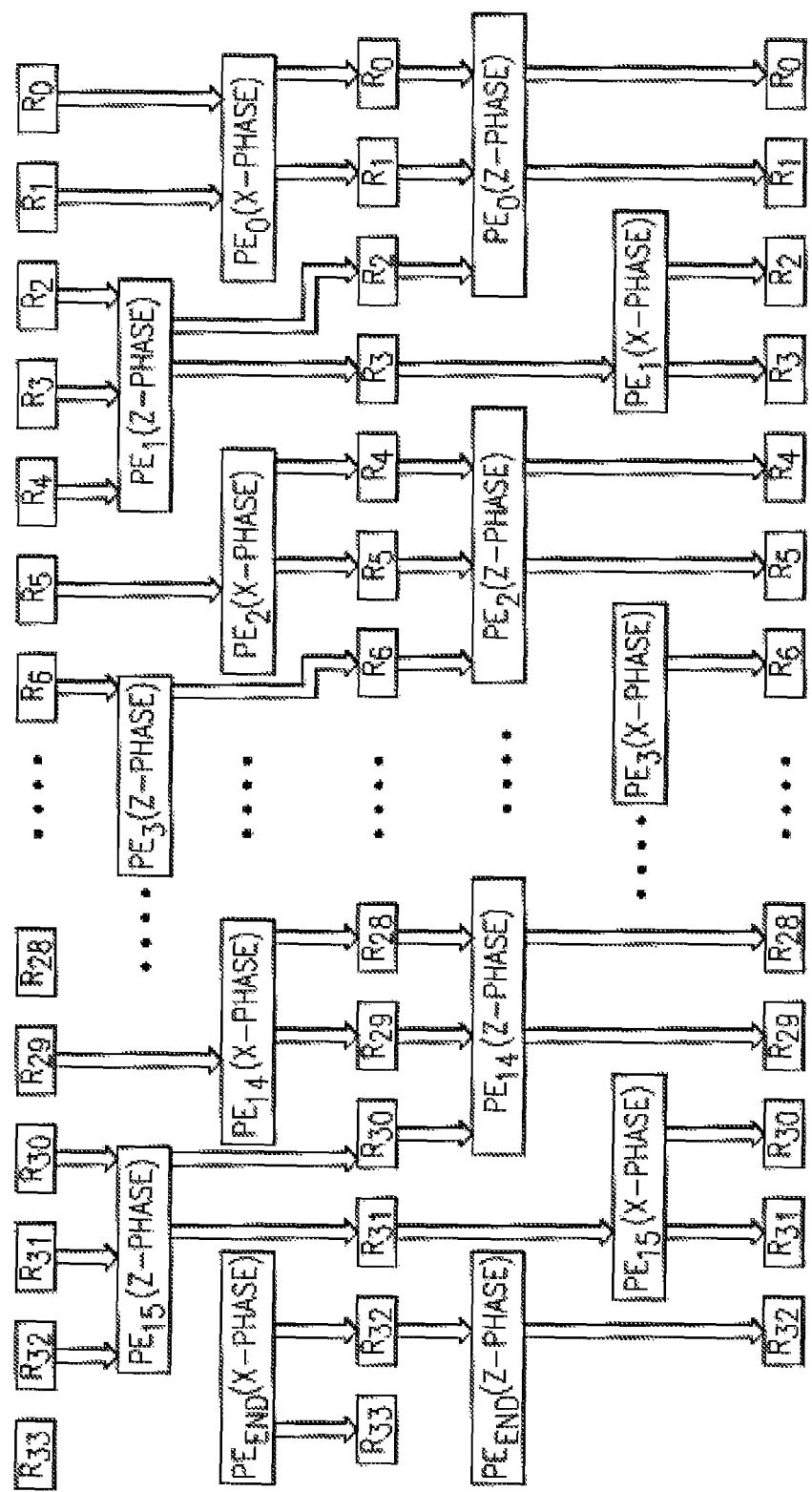
FIG. 12 is a block diagram similar to FIG. 8 but more particularly showing a variation in the utilization of pipelining to speed up processing time by eliminating an adder from a critical path.

Before proceeding to a discussion of yet another preferred embodiment of the present invention, it is worthwhile to consider the development described so far so in order to provide some overall perspective. In particular, a first preferred embodiment of the present invention provides a circuit such as that shown in FIG. 1 which employs relatively large multiplier and adder arrays. In a second preferred embodiment, the adder and multiplier arrays are partitioned so as to be deployed in a chained sequence of individual processing elements with each one possessing the same structure and passing information from the rightmost to the leftmost processing elements in a system which efficiently carries out the same operations as shown in FIG. 1. In a third preferred embodiment of the present invention, the processing elements are further provided with an additional adder and latches which enable the processing elements to be operated in a pipelined fashion, such as illustrated in FIG. 9. In the next preferred embodiment of the present invention which is now considered in detail below, additional adders 135 and 235 are repositioned in the circuit so as not to negatively impact critical data flow paths. It is now this embodiment which is described. In particular, in this embodiment, the processing elements and register sets are configured as shown in FIG. 12. In particular, it is noted that, in FIG. 12, the register connections to the individual processing elements are in fact different. This difference is due to the repositioning of the adder.

Figure 13B:
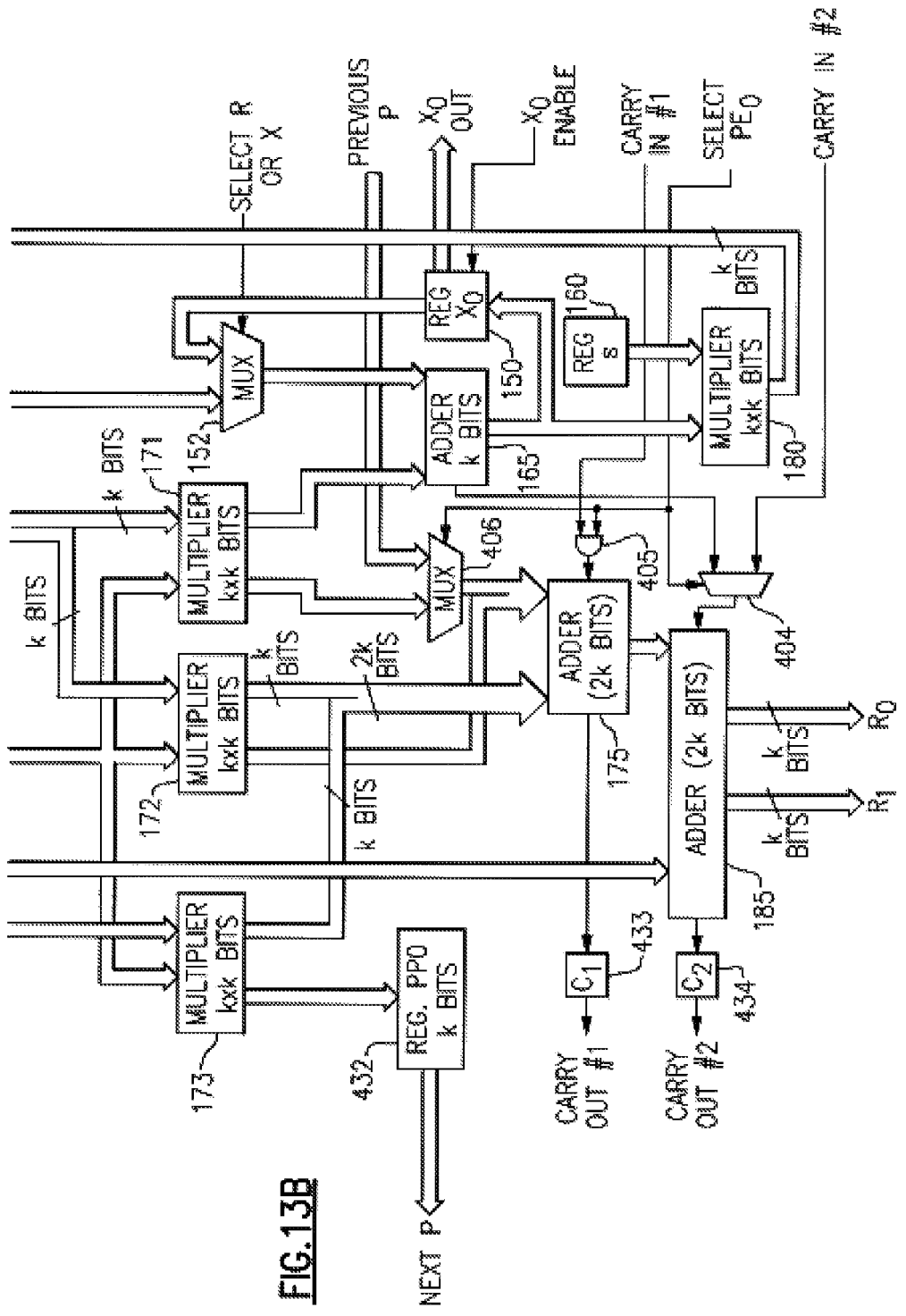
FIG. 13 (depicted as FIGS. 13A and 13B in the drawings) is a block diagram illustrating an improved rightmost processor element in which an adder in a critical path has been moved to improve performance.
Figure 14:
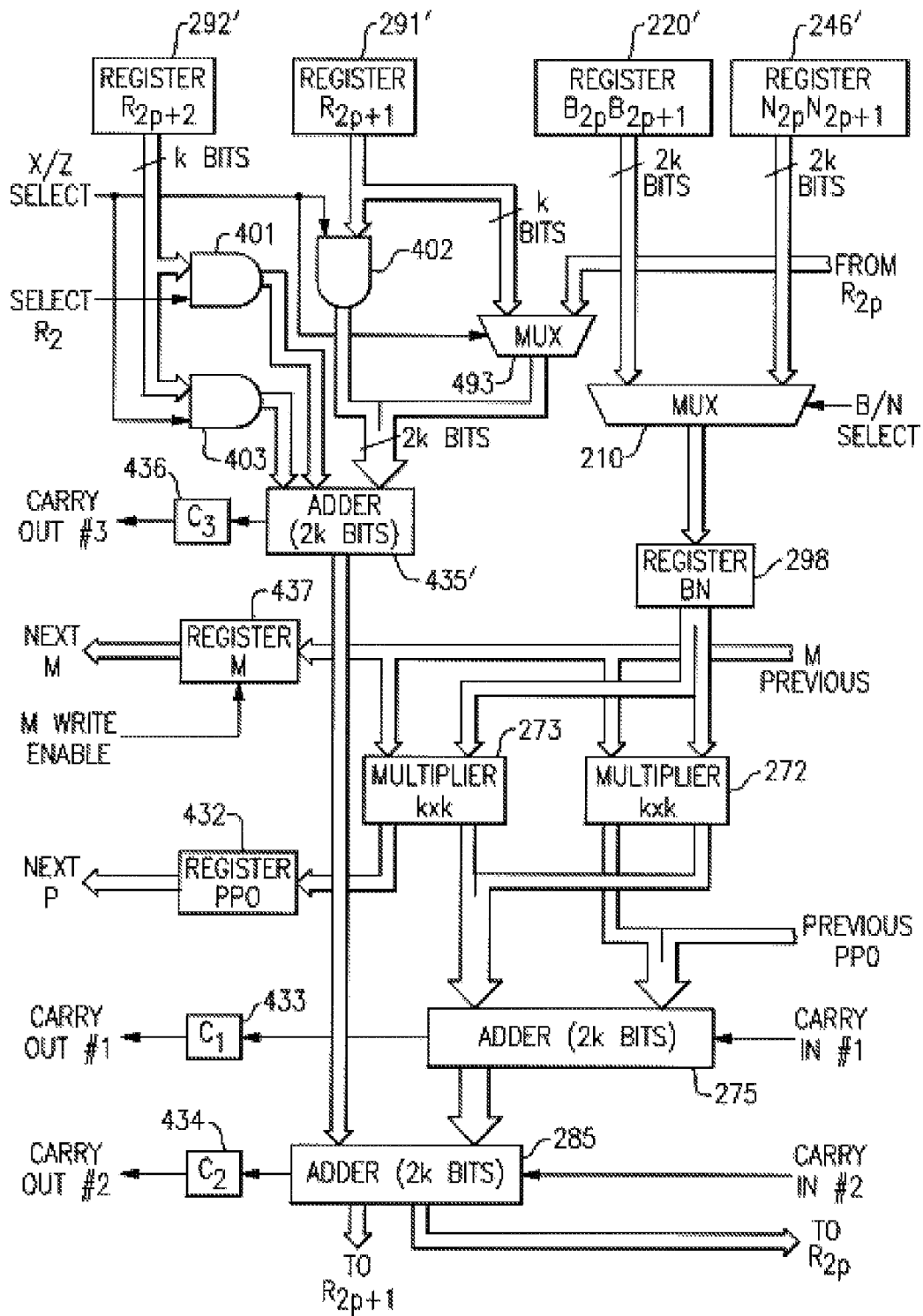
FIG. 14 is a block diagram similar to FIG. 13 but more particularly illustrating a typical processor element for use in an improved pipeline operation.

In particular, FIGS. 13A-B illustrates the repositioning of adder 135 from FIG. 11 to the position of adder 435 shown in FIG. 13A. Likewise, FIG. 14 illustrates the repositioning of adder 235 from FIG. 10 to the position shown as adder 435' as shown in FIG. 14. Accordingly, the design illustrated in FIGS. 10 and 11 for pipelined operations is improved even further by moving the indicated adder to the input stage of the processing elements which is facilitated by eliminating certain feedback paths between the processing elements, as shown. The adder is moved from the output of the processing element to the partial product input (R register path) and works in parallel with the slower multiplier function blocks. This eliminates an adder from a critical path. From FIG. 9, it can be seen that when processor element $PE_p$ is in the X-phase, it requires an input from both register portions $R_{2p+2}$ and $R_{2p+1}$. The $R_{2p+1}$ value is actually updated by the $p^{th}$ processor element during its previous clock cycle. The "problem" is that the value in $R_{2p-2}$, which is supposed to be contain the value of $Z_{2p+2}$ is updated in the same clock cycle by processor element p+1 ($PE_{p+1}$). It is noted that during the X-phase, processor element $PE_p$ adds the value $Z_{2p+2}$ contained in $R_{2p+2}$ to the upper k bits of its output and loads the result into $R_{2p+1}$ (this is the $X_{2p+1}$ value). Given that the contents of register $R_{2p+1}$ are used and updated exclusively by $PE_p$, one can proceed as follows: (1) during the X-phase, processor element $PE_p$ does not add the value of $R_{2p+2}$ to its output before loading $R_{2p+1}$; and (2) during the Z-phase $PE_p$ receives as an extra input, the value in register $R_{2p-2}$ (which at this time has been updated by $PE_{p+1}$ with $Z_{2p+2}$ and adds this immediately to the $R_{2p+1}$ input before any further processing). The modifications to the circuit shown in FIG. 11, which are illustrated in the circuit of FIG. 13, are designed to accomplish these goals.

The consequence of step (1) recited in the previous paragraph is that at this point the value generated by the processing elements during the X-phase is not any more the same as described in the algorithm set forth above. In order to compensate for this difference, another term is added during the Z-phase. The benefit of this change is an increase in the maximum frequency of operation and a reduction in the power of the needed by the circuit. Additionally, there are also advantages in terms of a reduced need for silicon area (that is, chip "real estate") together with advantages in having a more uniform and repeatable circuit design. Accordingly, FIG. 12 illustrates the new flow of data between the R register "set" and the processing elements. Likewise, FIGS. 13 and 14 illustrate the presence of additional circuitry to accomplish the objectives stated above.

The specific changes to the rightmost processing element for the improved pipelining version of the present invention are now specifically set forth. As above, a partial product out from multiplier 173 is latched up into k-bit wide register 432. Additionally, the variable M from multiplexor 131 is latched up into latch 437.

Repositioned adder 435 is an adder having a width of 2k bits. It also receives a carry input signal (carry-in 3) and includes two input signal lines. A 2k bit wide signal comes from a combination of the output from AND-gate 402 which is supplied from register $R_1$ (reference numeral 191). Register 191 also supplies multiplexor 193 which has as its other input the k bit output signal from register $R_0$ (reference numeral 190). The output of multiplexor 193 under the control of the "X/Z Select" signal line which causes the supply of either the output of register $R_1$ or register $R_0$ as the rightmost k bits for the right input to adder 435. (Note though that adders and multipliers are symmetric with respect to the use of left and right inputs since the desired operations are commutative.) The first (rightmost) 2k bit input to adder 435 is either ($R_1, R_0$) or (000 . . . 0, $R_1$) depending on the "X/Z Select" signal being 1 or 0, respectively. The "X/Z Select" signal configures the circuits for X-phase or for Z-phase operation. During the X-phase, adder 435 executes the following operation: (00 . . . 0, $R_1$)+0 which result is sent to adder 135. In comparison with FIG. 11, it is seen that adder circuit 185 in FIG. 13 receives ($R_1, R_0$) but can also receive the additional signal input ($R_2$, 00 . . . 0). The reason for this option is based on pipelining operations because in such a mode the Processing Element (PE) on the left is always behind one clock cycle. For exampler since $PE_1$ in FIG. 11 is responsible for updating the $R_2$ register with the Z value, this means that during the X-phase $PE_0$ needs the Z value stored in $R_2$ in $PE_1$ which is still generating it. Thus, in FIG. 11, adder 135 is used to transform the X value in $R_2$ to the successive Z value. However, in contrast in FIG. 13, the value in $R_2$ is added later in the next phase (a Z phase) via adder 435 which is not in a critical path.

The signal "Select $R_2$" is always 'zero' while the signal "X/Z Select" controls the X and Z phase during modular multiplication. This signal, when set to 'one' provides the capability of performing regular multiplication as opposed to modular multiplication as needed, or as desired. For regular multiplication, the "X/Z Select" signal line is always "zero" while the "Select $R_2$" signal line is always "one."

The other input to adder 435 is a 2k bit wide signal whose rightmost k bits, driven by the AND-gate 401, are all zeros during a modular multiplication or equal to the Register $R_2$ value during a standard multiplication as determined by the signal "Select R2". The output of AND-gate 401 is connected now to the lower k bits of the leftmost 2k bit input to adder 435. The leftmost k bits of this second input comes from register $R_2$ (reference numeral 192) under the control of the "X/Z Select" signal line which controls AND-gate 403, AND-gate 403 is, like multiplexor 193, also under control of the "X/Z Select" signal line, as shown. The reconfiguration of the adder's input signals is necessitated by the repositioning of adder 135 to a position which is not in a time-critical path.

The functioning of signal line "Select $PE_0$" is now more particularly described. The inclusion and functioning of this control line is not related to the repositioning of adder 435. When signal line "Select $PE_0$" is "one" the hardware in the processing element becomes equivalent to the generic hardware processor element $P_i(1 \leq i < d)$. When the "Select $PE_0$" signal line is set to "one," multiplier 406 selects the "Previous P" input signal bus and provides it to adder 175 (which is equivalent to adder 275 in $PE_i$). The output of AND-gate 405 changes from "zero" (in the case of $PE_0$ functioning) to the value driven by the carry input signal line for adder 175 (or 275 in $PE_0$ functioning). Multiplexor 404 selects the "Carry in 2" signal line and provides it as a carry input to adder 185 or 285 in $PE_i$ functioning). Accordingly, the "Select $PE_0$" signal line is used to "disable" the following devices so that the processing element operates as a generic $PE_i$ rather than as $PE_0$: multiplier 171, adder 165, multiplexor 152, multiplier 180, register 150 and register 160.

There are two cases in which it is desired that the "Select $PE_0$" signal line should be driven into the "one" state. This means that the PE behaves specifically like a generic $PE_i$ as opposed to the rightmost $PE_0$.

The first case is when the system is designed comprising two separate chains of Processing Elements. For example, each of the two chains is made up of a concatenation of one $PE_0$ together with seven PE's (that is, with eight Processing Elements per chain). These two chains (with eight PE's each) are particularly useful in carrying out operations of modular multiplication involving public key cryptography algorithms such as the RSA algorithm using the Chinese Remainder Theorem (CRT). In such cases, each of the two chains operates independently to perform two modular multiplications. In the case of modular multiplication as described above, there is thus provided a command which effectuates this operation together with an exponentiation function which is described in more detail below. In this case, the two chains of Processing Elements are concatenated to form a longer chain that is thus able to process more data in the same amount of time. In this case, the "$PE_0$" on the rightmost position of the left chain behaves as a $PE_i$ and receives the inputs from $PE_7$ (here "7" is used as an example which is in harmony with the exemplary chain size of eight, as recited above) from the right chain. This is accomplished by setting the "Select $PE_0$" signal to "one." These two chains may be represented diagrammatically as follows:

$$PE_{7B}PE_{6B}\ldots PE_{1B}PE_{0B} \Leftrightarrow PE_{7A}PE_{8A}\ldots PE_{1A}PE_{0A}.$$

In the event that the hardware herein is not being operated in the Chinese Remainder Theorem mode (to be discussed in more detail below), $PE_{0B}$ acts as a $PE_i$ and its "Select $PE_0$" signal input line is set to "one." There is also one other input control signal that is set to "one" in order to have $PE_{0B}$ act as a $PE_i$. In particular, this signal line is labeled "Auxiliary Select" in FIG. 13.

More particularly, control line "Select $PE_0$" controls the operation of multiplexors 404 and 406 and AND-gate 405. In the $PE_0$ mode of operation, the carry-in 1 signal line is supplied to adder 175 together with the signal from the previous PE signal line coming in to the modified rightmost processing element shown in FIG. 13. If it is not in "$PE_0$ mode," no carry input is supplied to adder 175. Likewise, based upon the state of the "Select $PE_0$" signal line, multiplexor 404 operates to select, as a carry input to the low order position of adder 175, either the usual carry-out signal from adder 165 or, in the event of non-$PE_0$ mode operation, the signal supplied to the carry input of adder 185 is the carry-in 2 signal. Apart from these variations, the rest of the circuits shown in FIG. 13 operate in substantially the same manner as their counterparts in FIG. 11.

FIG. 13 also introduces several other signal lines for proper operation in various hardware modes. As described above the "Auxiliary Select" signal line is a 2 bit signal taking on the values "00," "01", or "10." The "Auxiliary Select" line has the value "10" to $PE_{0b}$ above to concatenate $PE_{0B}$ with $PE_{7A}$ on its right in the case of non-CRT operation. This is the only time that the "Auxiliary Select" signal bus is set to this value. In the other cases, this signal line is set to "01" during the Z-phase (Select X/Z=1). The "00" value of "Auxiliary Select" selects the $A_i$ input used for the X-phase while the "01" value for this signal line selects the Y input for the Z-phase of operation.

With respect to the other signal lines present in FIG. 13, the "Select R or X" signal line is equivalent to "Select X/Z"; and the "Select $R_2$" signal line is driven independently when the Processing Elements are used to perform standard multiplication operations as opposed to modular multiplication. The "Select B or N" signal line assumes the value given by "Select X/Z" during the next clock cycle (that is, the anticipated version of "Select X/Z"). The reason for this is that the output of multiplexor 121 is used to select what is stored in BN register 193 which contains B during an X-phase and n during a Z-phase.

FIG. 14 illustrates modifications made to the circuit shown in FIG. 10 to accommodate repositioning adder 235 in FIG. 10 to a position in the signal flow path which reduces time criticality with respect to addition operations. With respect to the specific differences between FIGS. 10 and 14, it is noted that, in FIG. 14, it is no longer necessary to supply the low order k pit output from adder 285 to the processing element to the right. Additionally, it is noted that instead of she signal line being labeled $A_i$/y, the input signal line is labeled M to reflect the fact that multiplexor 131 in FIG. 13 now has three possible inputs to select from rather than just $A_i$ or y. The third input of multiplexor 131 (that is, the "Previous m" signal line) is used to concatenate $PE_{0B}$ to $PE_{7A}$ (as per the example given above) during non-CRT operations. This allows on-the-fly construction of a long chain of Processing Elements (sixteen in the example) versus two independent chains of half as many (that is, eight in the example) Processing Elements.

Additionally, adder 435' which is 2k bits wide is now interposed between its corresponding register set segment and adder 285. In particular, the output of adder 435' is supplied as the second input to adder 285 and the carry out of adder 435' is supplied to latch (reference numeral 436) which supplies the carry-out 3 signal line. The contents of register $R_2p-2$ (reference numeral 292') which is k bits in width is supplied as the lower k-bit portion of the left adder input under control of AND-gate array 401 which is in turn controlled by the signal line "Select $R_{2p+2}$". The contents of register $R_{2p+2}$ are also supplied as the upper k-bit portion of the left adder input under control of AND-gate array 403 which is in turn controlled by the "X/Z Select" signal line. The right input to adder 435' is also 2k bits so width and is supplied from AND-gate array 402 and from multiplexor 493. Under control of the "X/Z Select" signal line, multiplexor 493 provides either the contents of register $R_2p+1$ (reference numeral 291') or the contents of register $R_2p$ from the processing element on the right. The 2k-bit data portion supplied to the left input of adder 435' is controlled by AND-gate 401 and by AND-gate 403. The right 2k-bit input to adder 435' includes two portions one of which is a high order k bit wide portion which is either zero or the k-bit data portion coming from register $R_2p+2$ (reference numeral 292") control of AND-gate array 401 which is also under control of the "Select $R_2$" signal line. The lower order k bit wide portion of the right input to adder 435' is selected by multiplexor 493 to be either the contents of register 291' (that is, $R_{2p+1}$) or the contents of the 292' register (that is, $R_{2p}$) in the processing element to the right. The operation of the circuits described produces the result that adder 235 (FIG. 14) accumulates the results of the multiplication operations performed by multipliers 272 and 273 together with the output of adder 275. The left input of adder 285 is dependent on the phase of the operation for the Processor Element containing adder 285. For example, during the X-phase the result is $(00 \ldots 0, R_{2i+1})$ while during the Z-phase, the result is the binary sum $(R_{2i+1}, R_{2i})+(R_{2i+2}, 00 \ldots 0)$, where "$00 \ldots 0$" is k bits wide. The term including $R_{2i+1}$ is added only during the Z-phase since, during the X-phase, this register value is still being updated by the Processing Element to the left. This aspect is best seen in FIG. 12.

Figure 15:
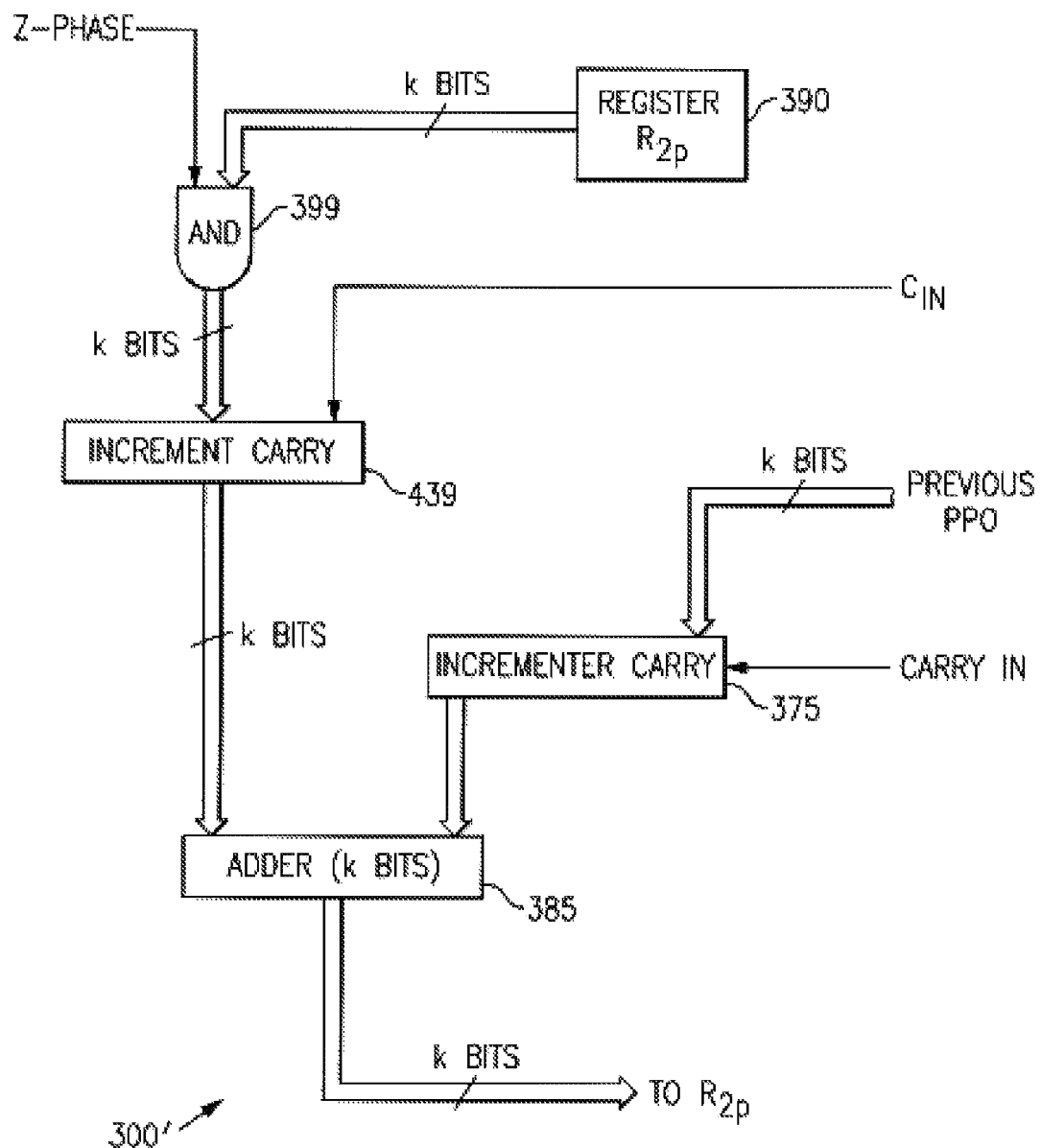
FIG. 15 is a block diagram illustrating a preferred design for the leftmost processor element in an improved pipelined configuration.

Additionally, it is noted that if one desires to employ a simplified leftmost processing element such as one that is similar to that shown in FIG. 6, modifications are made to this circuit to accommodate the improved pipelining version associated with FIGS. 13 and 14. In particular, this is accomplished by the inclusion of an increment-carry circuit 439 between previously employed AND-gate array 399 and k bit wide adder 385. The other signals supplied to increment carry circuit 439 is a carry input $C_{in}$ which comes from latch 436 in the processing element to the immediate right of the circuit shown in FIG. 15. In particular, this signal line is designated as carry-out 3 in FIG. 14. As above, the use of a simplified leftmost processing element ($PE_d$) is optional but is clearly desired for purposes of circuit simplification, speed, and cost. The Processing Element $PE_{END}$ or $PE_d$ includes the function of adding the previous PPO (Partial Product Out) from the PE to its right to the potential carry out signal from adder 435' which signal is temporarily stored in latch $C_3$ (436). This result is stored in register $R_{2p}$. During the Z-phase, the result of this operation is accumulated in register $R_{2p}$, as shown.

Figure 16:
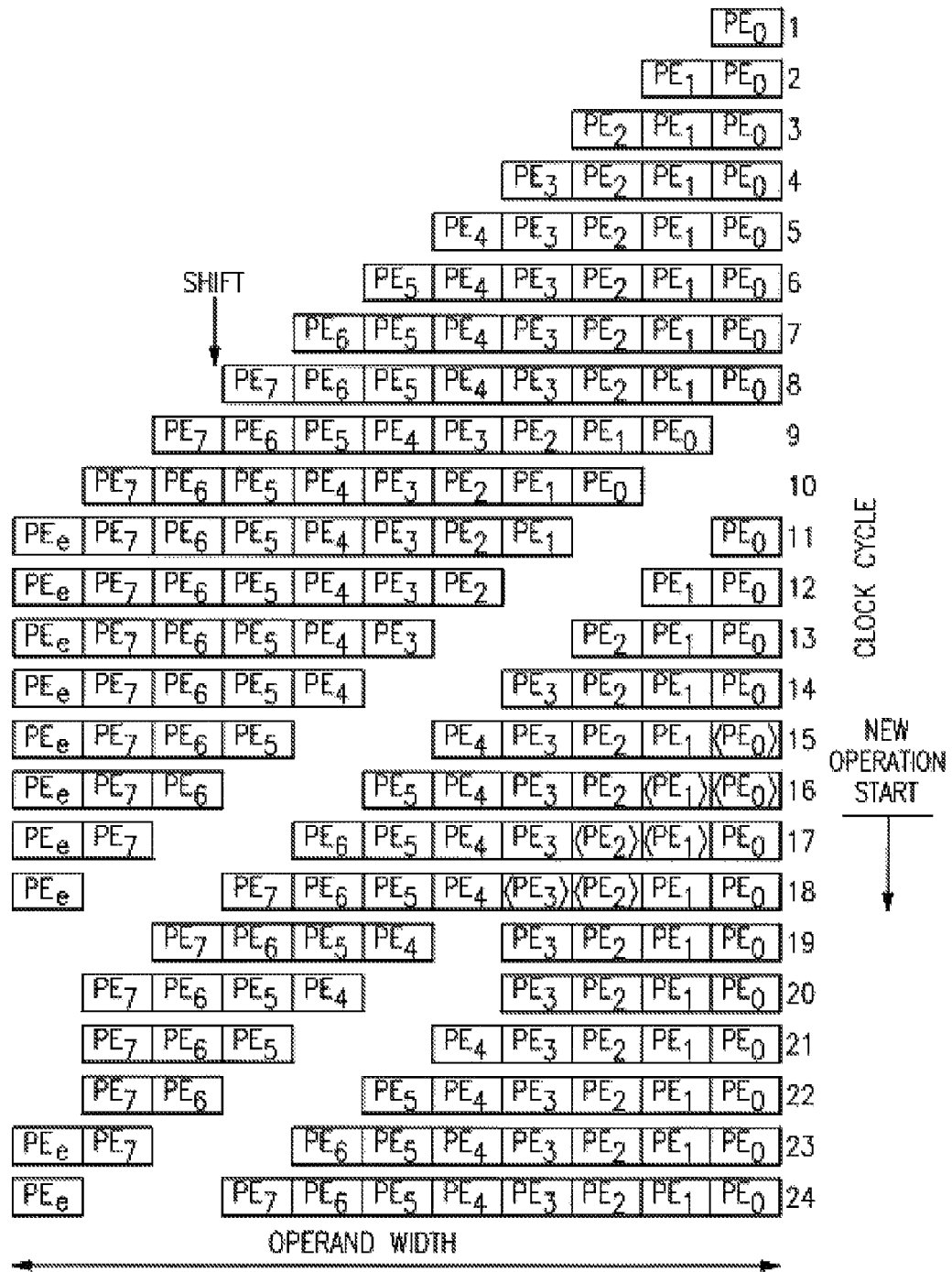
FIG. 16 illustrates processor element utilization in pipelined operations.

It is noted that it is also possible to utilize the pipelined version of the present invention to process operands that are actually in fact wider than the hardware present in the processing element chain width (n>>Wd or equivalently n>>mk). The method for carrying out this extra wide operation processing is illustrated in FIG. 16. In particular, each horizontal line in FIG. 16 represent a single clock cycle and each vertical column represents a slice of the data that is to be processed. Assuming that each processing element processes 64 bits of data (2k bite typically), the first column indicates that the lower two k bits of the data are always processed by processing element $PE_0$. During the first clock cycle, only processing element $PE_0$ is active. All of the other processing elements are activated sequentially, clock cycle after clock cycle. This provides sufficient time to the previous processor element to generate the pipelined data for the next processing element. In fact, it is possible that the width of the operand is larger than the processing element chain itself. For example, in the discussions herein, the situation in which n=512 bits has been considered. However, in accordance with this aspect of the present invention, it is possible to process operands that are longer than 512 bits using a pipelined hardware structure which is designed for 512 bits. In such circumstances the clock cycle after the first processing element is activated, the entire processing element chain is shifted left by 2k bits (see FIG. 16) leaving the lower two k bits unprocessed. This shifting continues until the upper processing element (in this case, $PE_B$) is capable of processing the upper 2k bits of the operand. Following this, the processing element chain, instead of shifting back to the home position, stays in place with the exception of the rightmost processing element $PE_0$. The lower processing element, after the others go into a home position, continues processing the lower two k-bit slice of the operand. When all of the processor elements are back in their home positions, the entire chain starts a shift left as before. This mechanism allows all of the processing elements to be busy all of the time and, accordingly, achieves a maximum performance level. Additionally, a new operation can start before the previous operation is finished. The approach described herein provides maximal performance in the sense that all of the Processing Elements are always busy. Additionally, the next operation can be started immediately without any delay and without idling any of the Processor Elements. Furthermore, these operations are fully compatible with the pipelined approach as described above.

The inventors have found that further pipelining improvements can be achieved when the X-phase of each modulo N operation is further divided into two subphases a-X and b-X and the Z-phase of each modulo N operation is further divided into two subphases a-Z and b-Z. FIG. 17 is a diagram illustrating the performance of operations by Processing Elements according to a-X and b-X subphases and a-Z and b-Z subphases to perform modulo-N multiplication relative to two operands, each of 5k bits in length, k being the number of bits of each operand that each Processing Element is designed to handle in a single subphase. The vertically oriented sequence of numbers 1 to 15 found at the right edge of FIG. 17 indicates numbered cycles of operation of each Processing Element. From an inspection of FIG. 17, it will be seen that, with the exception of the very first cycle of operation performed by each Processing Element, each Processing Element simultaneously performs the work, of two of the subphases selected from a-X, b-X, a-Z and b-Z. As each such subphase can be performed in a shorter operational cycle than the entire X-phase or entire Z-phase, each Processing Element is able to complete the two X-subphase operations in a shorter amount of time, and to complete the Z-subphase operations in a shorter amount of time, reducing processing time overall.

Specifically, referring to FIG. 17, in the operational cycle labeled "1", the rightmost Processing Element PE0 begins work on a modulo N operation. A first portion of PE0, labeled PE0$a$ performs the a-X0 subphase operation in cycle 1. A second portion of PE0, labeled PE0$b$, is idle during cycle 1, PE0a can be considered a first set of circuits of the Processing Element PE0 which are coupled to a second set of circuits of that same PE0. Hereinafter, the first and second portions of PE0 are referred to as the "top" and "bottom" portions of PE0, respectively, according to the way the portions appear in FIGS. 18A-B, as discussed below. Each of the top and bottom portions of the rightmost Processing Element PE0 and of other Processing Elements PE1 through PEn include internal registers which latch their results once during each operational cycle. In this way, in each operational cycle, the top portion of each Processing Element can do the work of a particular subphase while the bottom portion simultaneously does the work of a different subphase.

As further shown in FIG. 17, during cycle 2, PE0a, the top portion of PE0 performs the a-Z0 subphase operation and the PE0b, the bottom portion of PE0, simultaneously performs the b-X0 subphase. Continuing, in cycle 3, the top portion PE0a performs the a-X subphase on a next subsequent modulo N operation, denoted PE0a-X0'. This next subsequent modulo N operation is pipelined to be performed in overlapped fashion by each Processing Element in the chain in the next following cycle in which a fop or bottom portion of a Processing Element becomes available after performing work on the current modulo N operation. Also during cycle 3, PE0b, the bottom portion of PE0, performs the b-Z subphase of the current modulo N operation. With that, by the end of cycle 3, both X-subphases and both Z-eubphases have been fully performed by the top and bottom portions of PE0.

In the interim, in cycle 2 PE1, the first Processing Element to the left of PE0, begins work on higher order bits of the operands. During cycle 2 PE1a, the top portion of PE1, first performs the subphase PE1a-X1. Also during cycle 2 PE1b, the bottom portion of PE1, is idle because the first a-X1 subphase must be performed first to prepare PE1b, the bottom portion of PE1 for use. Thereafter, as further shown in cycle 3, the top portion PE1a is now put to use in performing the Z-subphase a-Z1. Also in cycle 3, simultaneously therewith, PE1b, the bottom portion of PE1 performs the X-subphase b-X1 as denoted "PE1b-X1" in FIG. 17.

Also in cycle 3, PE2 first begins to perform work on the current modulo N operation. During cycle 3 PE2a, the top portion of PE2, first performs the subphase PE2a-X2, Also during cycle 2 PE2b, the bottom portion of PE2, is idle because the first a-X2 subphase must be performed first to prepare PE2b for use.

Figure 18A:
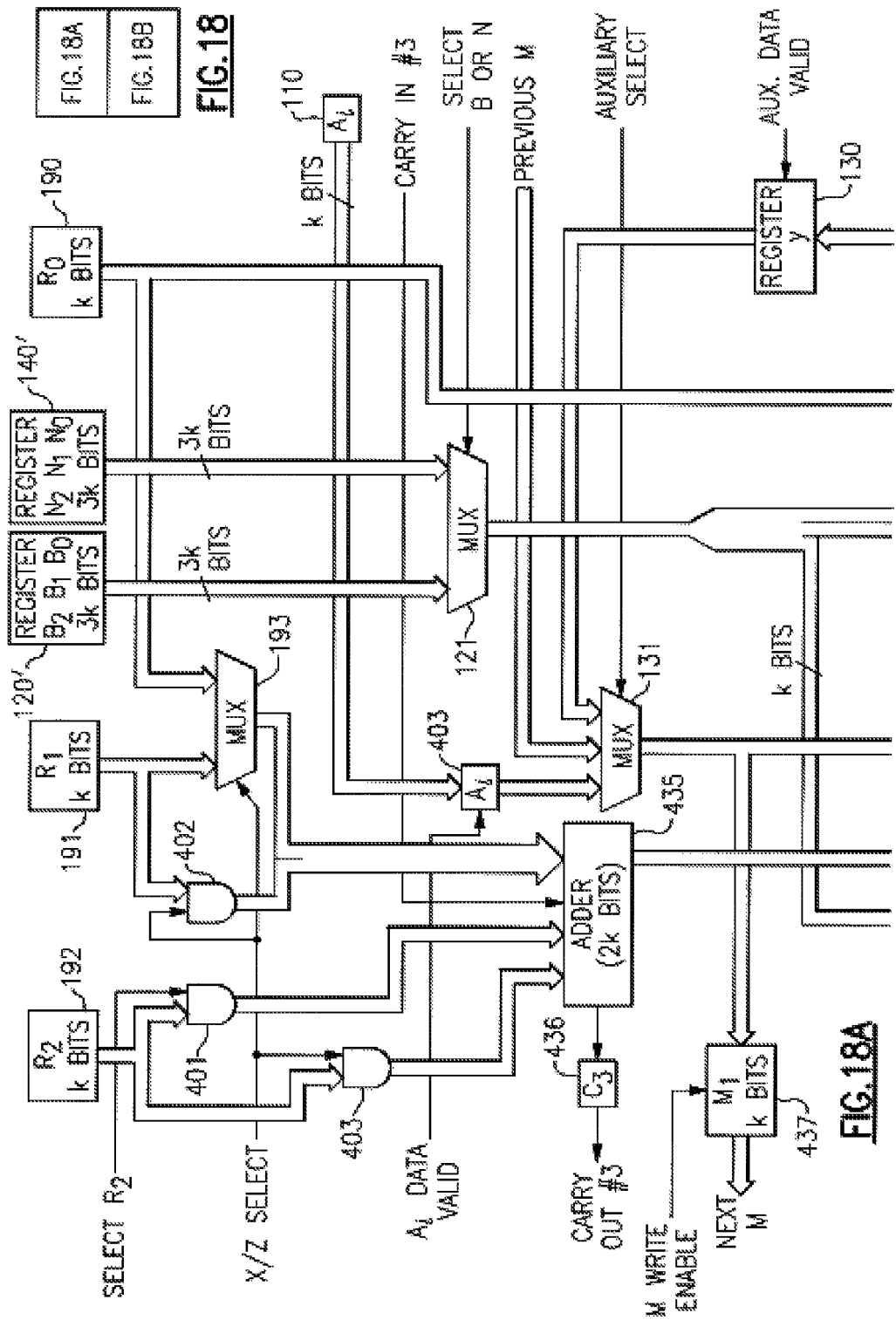
FIGS. 18A-18B together form one diagram illustrating the structure of a simultaneous two-phase enabled rightmost processing element PE0 in accordance with an embodiment of the invention.
Figure 18B:
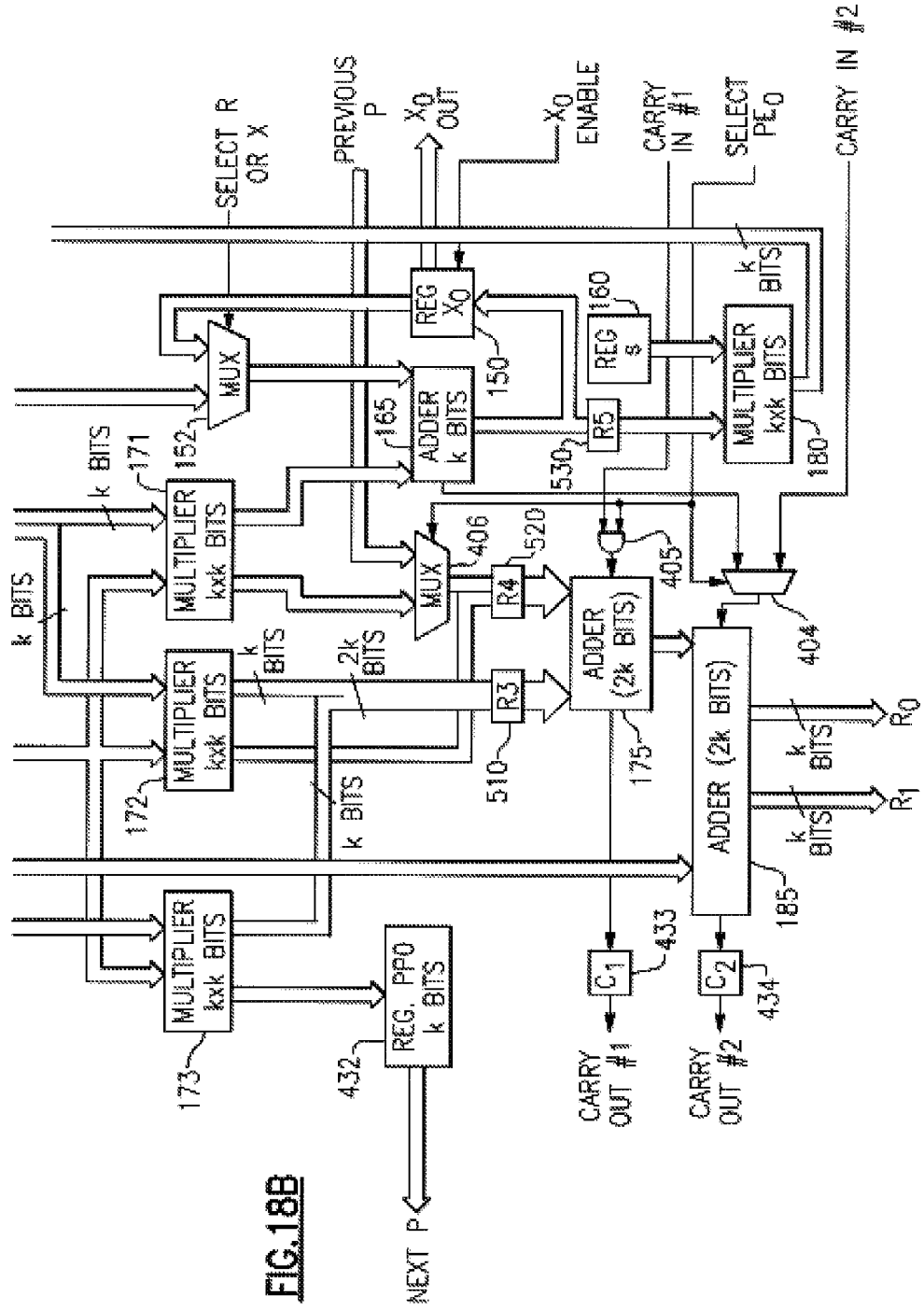

FIGS. 18A-18B illustrate modifications to an exemplary rightmost Processing Element PE0 which enable simultaneous operation in two-subphases in the manner described above with respect to FIG. 17. Comparing the exemplary two-phase PE0 shown in FIGS. 18A-B with the single-phase Processing Element PE0 shown in FIGS. 13A-B, it is seen that the BN register no longer appears at the output of multiplexor (MUX) 121 (FIG. 18A). In addition, three new registers R3 (510), R4 (520) and R5 (530) appear in PE0, as shown in FIG. 18B. Register R3 (510) is a 2k bit wide register which is used to latch the output of multipliers 172 and 173. Register R4 is also a 2k bit wide register which is used to latch the output of multiplier 172 and the output of multiplexor (MUX) 406. Register R5 (530) is a k bit wide register which latches the output of adder 165. The new registers R3, R4, and R5 latch the outputs of the circuits that feed them once every cycle to enable that Processing Element to perform work simultaneously in two different subphases.

Figure 19:
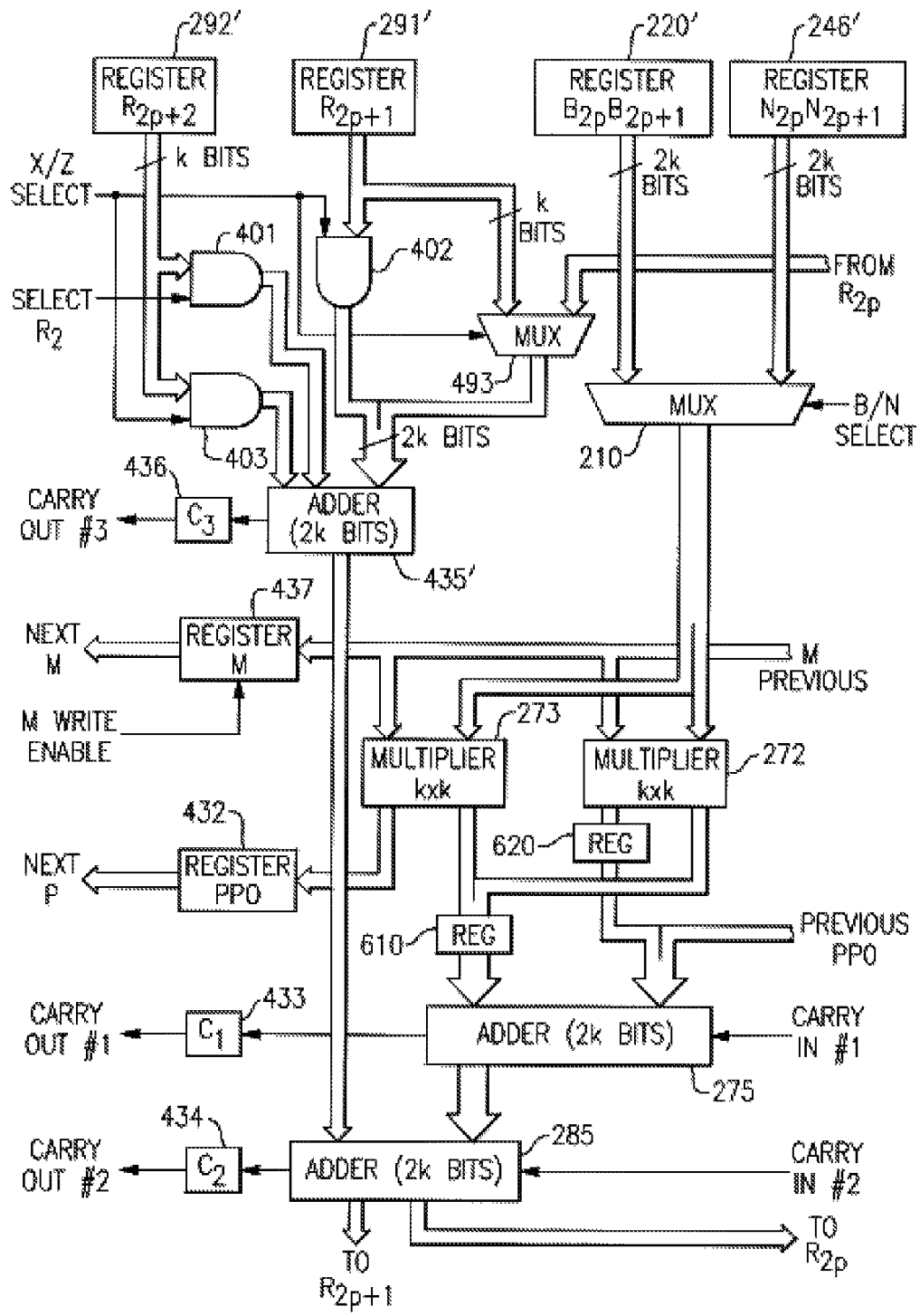
FIG. 19 is a diagram illustrating the structure of a simultaneous two-phase enabled processing element, being one of PE1 to PEn−1 to the left of processing element PE0, in accordance with an embodiment of the invention.

Modifications to the design of other Processing Elements PE1 to PEn-1 to the left of the rightmost Processing Element are shown in FIG. 19. Comparing the two-subphase design shown in FIG. 19 to its single-phase counterpart shown in FIG. 14, it is seen that register BN is removed from and registers 610 and 620 are now added to the circuit. The added register 610, which is 2k bits wide, and the added register 620, which is k bits wide, are used to latch the output of multipliers once every cycle to enable that Processing Element to perform work simultaneously in two different subphases. In addition, all control signals which are state machine controlled are redesigned to supped the operation of the processing elements shown in FIGS. 18 and 19.

While the invention has been described in accordance with certain preferred embodiments thereof, many modifications and enhancements can be made thereto without departing from the true scope and spirit of the invention, which is defined by the claims appended below.

What is claimed is:

1. A method for multiplying two multiplicands A and B each having up to n bits, modulo a number N having up to n bits, said method comprising:

supplying partitioned portions of multiplicand A to respective processing elements m of a chain of processing elements, each partitioned portion having up to k bits, wherein n=m·k, each processing element being a hardware circuit operable to process k bits of multiplicand A;

reserving a plurality of registers Z, wherein each of said registers Z corresponds to each of said processing elements;

setting a value stored in said corresponding register Z to 0;

for each of said processing elements:

storing in temporary register X a result of a product of said processing element and B plus the value stored in said corresponding register Z;

storing in another temporary register y a first partial product in a set of first subphases, said first partial product comprising a product of a constant and k least significant bits of said temporary register X modulo $2^K$;

storing in said corresponding register Z of the subsequent processing element a second partial product of a set of second subphases comprising a product of said first partial product and N plus said result stored in temporary register X divided by $2^k$;

each said hardware circuit being operable to simultaneously perform subphases of each of said sets of first and second subphases in each cycle of at least some cycles of said hardware circuit;

operating said processing elements in a pipelined manner to simultaneously produce in each of said at least some cycles, said first partial products and said second partial products;

passing said first partial products produced within said processing elements to at least one other processing element in said chain;

passing said second partial products produced within said processing elements to at least one other processing element in said chain; and accumulating temporary results in a register set over sufficient number of operational cycles to produce a product of said multiplicands modulo said number N in said register set.

2. The method of claim 1, wherein, except for said first and last processing element in said chain, all of said processing elements comprise identical circuits.

3. The method of claim 1, wherein said product is a first product, said method further comprising starting processing for a second product of multiplicands as soon as a first processing element of said chain finishes processing a last partitioned portion of said partitioned portions of said first product.

4. The method of claim 1, wherein each of said processing elements in said chain except for a last processing element is operable to process multiple respective partitioned portions of said multiplicand.

5. The method of claim 1, wherein each of said first set of subphases are further divided into two subphases a-X and b-X and said each set of second phases are further divided into two subphases a-Z and b-Z, with each said hardware circuit simultaneously processing subphases a-X, b-X, a-Z and b-Z subphases in each cycle of at least some cycles of said hardware circuit.

* * * * *